(12) United States Patent
Iyatani

(10) Patent No.: US 8,020,946 B2
(45) Date of Patent: Sep. 20, 2011

(54) VEHICLE BRAKE CONTROL UNIT BASE BODY AND VEHICLE BRAKE CONTROL UNIT

(75) Inventor: Masatoshi Iyatani, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 957 days.

(21) Appl. No.: 11/950,876

(22) Filed: Dec. 5, 2007

(65) Prior Publication Data
US 2008/0258544 A1 Oct. 23, 2008

(30) Foreign Application Priority Data

Dec. 6, 2006 (JP) ............................. P.2006-329185

(51) Int. Cl.
*B60T 8/36* (2006.01)
*F15B 13/00* (2006.01)

(52) U.S. Cl. ............... 303/119.1; 303/119.2; 303/119.3; 303/DIG. 10; 137/884

(58) Field of Classification Search ............... 303/119.1, 303/119.2, 119.3, DIG. 10; 137/884
See application file for complete search history.

(56) References Cited

U.S. PATENT DOCUMENTS

| 668,707 | A * | 2/1901 | Dinket et al. | 190/118 |
|---|---|---|---|---|
| 6,234,199 | B1 * | 5/2001 | Nohira | 137/557 |
| 6,398,315 | B1 * | 6/2002 | Dinkel et al. | 303/113.1 |
| 6,428,121 | B1 * | 8/2002 | Dinkel et al. | 303/191 |
| 6,554,375 | B1 * | 4/2003 | Dinkel et al. | 303/119.3 |
| 6,869,152 | B2 * | 3/2005 | Weh et al. | 303/116.4 |
| 2004/0046446 | A1 * | 3/2004 | Dinkel et al. | 303/119.3 |
| 2004/0090115 | A1 * | 5/2004 | Inoue et al. | 303/119.3 |
| 2004/0160120 | A1 * | 8/2004 | Weh et al. | 303/119.3 |
| 2006/0138860 | A1 * | 6/2006 | Hinz et al. | 303/119.3 |
| 2006/0220768 | A1 | 10/2006 | Iyatani | |

FOREIGN PATENT DOCUMENTS

| DE | 10 2004 027 256 | 1/2005 |
|---|---|---|
| EP | 1 541 436 | 6/2005 |
| EP | 1 707 463 | 10/2006 |
| JP | 2002-347595 | 12/2002 |
| JP | 2006-161913 | 6/2006 |
| JP | 2006-312359 | 11/2006 |

OTHER PUBLICATIONS

Japanese Office Action for corresponding Japanese Application No. 2006-329185 (English translation).
Extended European Search Report for corresponding European Application No. 07023552.8.

* cited by examiner

*Primary Examiner* — Bradley King
*Assistant Examiner* — Mahbubur Rashid
(74) *Attorney, Agent, or Firm* — Andrew M. Calderon; Roberts Mlotkowski Safran & Cole, P.C.

(57) ABSTRACT

A base body has flow path configuring portions, has inlet and outlet ports, a central mounting hole 31, a central flow path 51 penetrating the central mounting hole 31, first inner and outer mounting holes 32, 33 disposed upstream side of the central mounting hole 31, second inner and outer mounting holes 34, 35 disposed downstream side of the central mounting hole 31, a third mounting hole 36 disposed below the second outer mounting hole 35, a wheel side sensor mounting hole 46 disposed on an extension of the outlet port 22L between the first inner mounting hole 32 and the second inner mounting hole 34, and a hydraulic pressure source side sensor mounting hole 45 disposed on a center line X of the base body so as to straddle to extend to the flow path configuring portions across the center line X.

4 Claims, 10 Drawing Sheets

VEHICLE BRAKE CONTROL UNIT BASE BODY AND VEHICLE BRAKE CONTROL UNIT

TECHNICAL FIELD

The present invention relates to a vehicle brake control unit base body and a vehicle brake control unit.

RELATED ART

While various types of vehicle brake control units have been proposed, for example, as a hydraulic pressure circuit for a four-wheel vehicle brake control unit, there is known a hydraulic pressure circuit in which in addition to an anti-lock brake control for each wheel brake, a skid control and a traction control (hereinafter, these controls being referred collectively as a "behavior stabilizing control") are performed in such a state that a brake actuator such as a brake pedal is not operated.

This hydraulic pressure circuit includes a brake output circuit for actuating two of four wheel brakes and another brake output circuit for actuating the remaining two wheel brakes. A control valve unit for adjusting magnitude of brake hydraulic pressure applied to the wheel brake is provided for each wheel brake. That is, two control valve units are provided for one brake output circuit. Thus, an anti-lock brake control can be performed on each wheel brake independently. Furthermore, a regulator for opening and closing a flow path between the hydraulic pressure source and the control valve units, and a pump for supplying brake fluid to a flow path between the regulator and the control valve units are provided for each brake output circuit, thereby the behavior stabilizing control is enabled.

In each brake output circuit, a set of two electromagnetic valves (an inlet valve, an outlet valve) is provided for each control valve unit, and a electromagnetic valve (a cut-off valve) which closes when performing a interlocking brake control is provided in the regulator. Furthermore, a electromagnetic valve (a suction valve) which opens when performing a behavior stabilizing control is interposed on an inlet side of the pump. In this configuration, with the two brake output circuits added together, twelve electromagnetic valves are used therein.

Furthermore, in recent years, in association with the trend that vehicle brake control units are provided with a multiplicity of functions, a hydraulic pressure sensor for measuring a brake hydraulic pressure is tend to be provided in a hydraulic pressure circuit. As a vehicle brake control unit which realizes a hydraulic pressure circuit including such a hydraulic pressure sensor, there has been such a vehicle brake control unit, for example, as is described in Japanese Patent Unexamined Publication No. JP-A-2002-347595.

In this vehicle brake control unit, on one surface of a block (base body), formed are:
four recessed portions (holes) for pressure increasing control valves;
four recessed portions (holes) for pressure reducing control valves;
four recessed portions (holes) for brake hydraulic pressure sensors;
two recessed portions for master pressure sensors;
one recessed portion for a hydraulic pressure sensor; and
a plurality of hydraulic pressure sensors. Thus, many hydraulic pressure sensors are provided within the block (base body).

In the vehicle brake control unit as is described in JP-A-2002-347595, although it becomes possible to implement various brake controls due to the large number of hydraulic pressure sensors, the enlargement of the base body is called for because a wide space is necessary to mount the hydraulic pressure sensors. Due to this, there has been caused a problem that the vehicle brake control unit itself has also to be enlarged. Then, when the vehicle brake control unit is enlarged in this way, there has also been caused a problem that the installation of such an enlarged vehicle brake control unit is limited in association with a limited space therefor in the vehicle.

SUMMARY OF THE INVENTION

From the viewpoint like this, a problem that the invention is to solve is how to provide a vehicle brake control unit base body and a vehicle brake control unit.

In order to solve this problem, according to an aspect of the invention, there is provided a vehicle brake control unit base body for a vehicle brake control unit which includes:
a first brake output circuit for actuating at least one of wheel brakes; and
a second brake output circuit for actuating the remaining wheel brakes,
the vehicle brake control unit base body including:
first and second flow path configuring portions which correspond to the respective first and second brake output circuits and are formed left and right hand parts of the base body across a center line thereof, respectively,
wherein each of the first and second flow path configuring portions includes:
an inlet port to which a piping from a hydraulic pressure source is connected;
at least one outlet port to which at least one of the wheel brakes are connected;
a central mounting hole;
a central flow path which originates from the inlet port and passes through the central mounting hole;
a first inner mounting hole and a first outer mounting hole which are provided at upstream side of the central mounting hole so as to oppose to each other via the central flow path;
a second inner mounting hole and a second outer mounting hole which are provided at downstream side of the central mounting hole so as to oppose to each other via the central flow path;
a third mounting hole which is disposed so that the first outer mounting hole, the second outer mounting hole and the third mounting hole are arranged in this order in a vertical direction;
a wheel side sensor mounting hole which is disposed on an extension of the outlet ports and also between the first inner mounting hole and the second inner mounting hole, and mounts a wheel side brake hydraulic pressure sensor measuring brake hydraulic pressure outputted to one of the wheel brakes; and
a hydraulic pressure source side sensor mounting hole which is disposed on the center line of the base body so as to straddle the center line to extend to the respective flow path configuring portions and mounts a hydraulic pressure source side brake hydraulic pressure sensor for measuring brake hydraulic pressure outputted from the hydraulic pressure source,
wherein the respective central mounting hole, the first inner and outer mounting holes, the second inner and outer mounting holes and the third mounting hole mounts an electromagnetic valve.

According to the vehicle brake control unit base body which has the positional relationship described above, when the base body is applied to a brake control unit, the brake control unit can be made small in size while the twelve electromagnetic valves and the plurality of (three) hydraulic pressure sensors are provided in one surface of the base body. Furthermore, with the vehicle brake control unit to which the base body is applied, it becomes possible to implement multiple complex and highly accurate safety functions which involve the control of vehicle brakes.

In addition, according to another aspect of the invention, there is provided a vehicle brake control unit including:

a brake output circuit for actuating at least one of wheel brakes;

a brake output circuit for actuating the remaining wheel brakes;

the base body as set forth in Claim 1;

normally open type electromagnetic valves which constitute inlet valves mounted in the first inner mounting holes and the first outer mounting holes, respectively;

normally closed type electromagnetic valves which constitute suction valves mounted in the central mounting holes;

normally closed type electromagnetic valves which constitute outlet valves mounted in the second inner mounting holes and the second outer mounting holes, respectively;

normally open type electromagnetic valves which constitute cut-off valves mounted in the third mounding holes;

a hydraulic pressure source side brake hydraulic pressure sensor mounted in the hydraulic pressure source side sensor mounting hole and measuring magnitude of brake hydraulic pressure in the hydraulic pressure source;

wheel side brake hydraulic pressure sensors mounted in the wheel side sensor mounting holes and measuring magnitude of brake hydraulic pressure applied to the wheel brake;

a motor which is assembled on a rear side of the base body and drives a pump;

a control housing assembled on a front side of the base body so as to cover the respective electromagnetic valves; and a control unit which is accommodated in the control housing and controls operations of the motor and the respective electromagnetic valves.

According to the vehicle brake control unit having the positional relationship described above, the brake control unit can be made small in size while the twelve electromagnetic valves and the plurality of (three) hydraulic pressure sensors are provided in one surface of the base body. Furthermore, it becomes possible to implement multiple complex and highly accurate safety functions which involve the control of vehicle brakes.

In addition, in the vehicle brake control unit, it is preferable that the first brake output circuit is connected to the wheel brakes of a front wheel and a rear wheel, the second brake output circuit is connected to the wheel brakes of the other front wheel and the other rear wheel and each of the wheel side brake hydraulic pressure sensors measures magnitude of the brake hydraulic pressure applied to the front wheel.

According to the configuration described above, since the brake hydraulic pressures on the wheel brakes of the front wheels to which more brake load is applied can be detected by the wheel side brake hydraulic pressure sensors while realizing the miniaturization of the unit. Thus, a brake hydraulic pressure control can be implemented in which emphasis is placed on braking force control, thereby making it possible to enhance further the accuracy of the brake hydraulic pressure control.

Furthermore, in the vehicle brake control unit, it is preferable that the first brake output circuit is connected to the wheel brakes of a front wheel and a rear wheel, the second brake output circuit is connected to the wheel brakes of the other front wheel and the other rear wheel and each of the wheel side brake hydraulic pressure sensors measures magnitude of brake hydraulic pressure applied to the wheel brake of the front wheel or the rear wheel which constitutes a drive wheel.

According to the configuration described above, since the brake hydraulic pressures on the wheel brakes of the drive wheels can be detected by the wheel side brake hydraulic pressure sensors while realizing the miniaturization of the unit, a brake hydraulic pressure control can be implemented in which emphasis is placed on traction control, thereby making it possible to enhance further the accuracy of the brake hydraulic pressure control.

According to the vehicle brake control unit base body and the vehicle brake control unit according to the invention, the vehicle brake control unit can be made small in size while having the plurality of (three) hydraulic pressure sensors. Furthermore, it becomes possible to implement multiple complex and highly accurate safety functions which involve the control of vehicle brakes.

DETAILED DESCRIPTION OF THE PREFERRED EMBODIMENTS

Hereinafter, a best mode for carrying out the invention will be described in detail by reference to the accompanying drawings.

Figure 1:
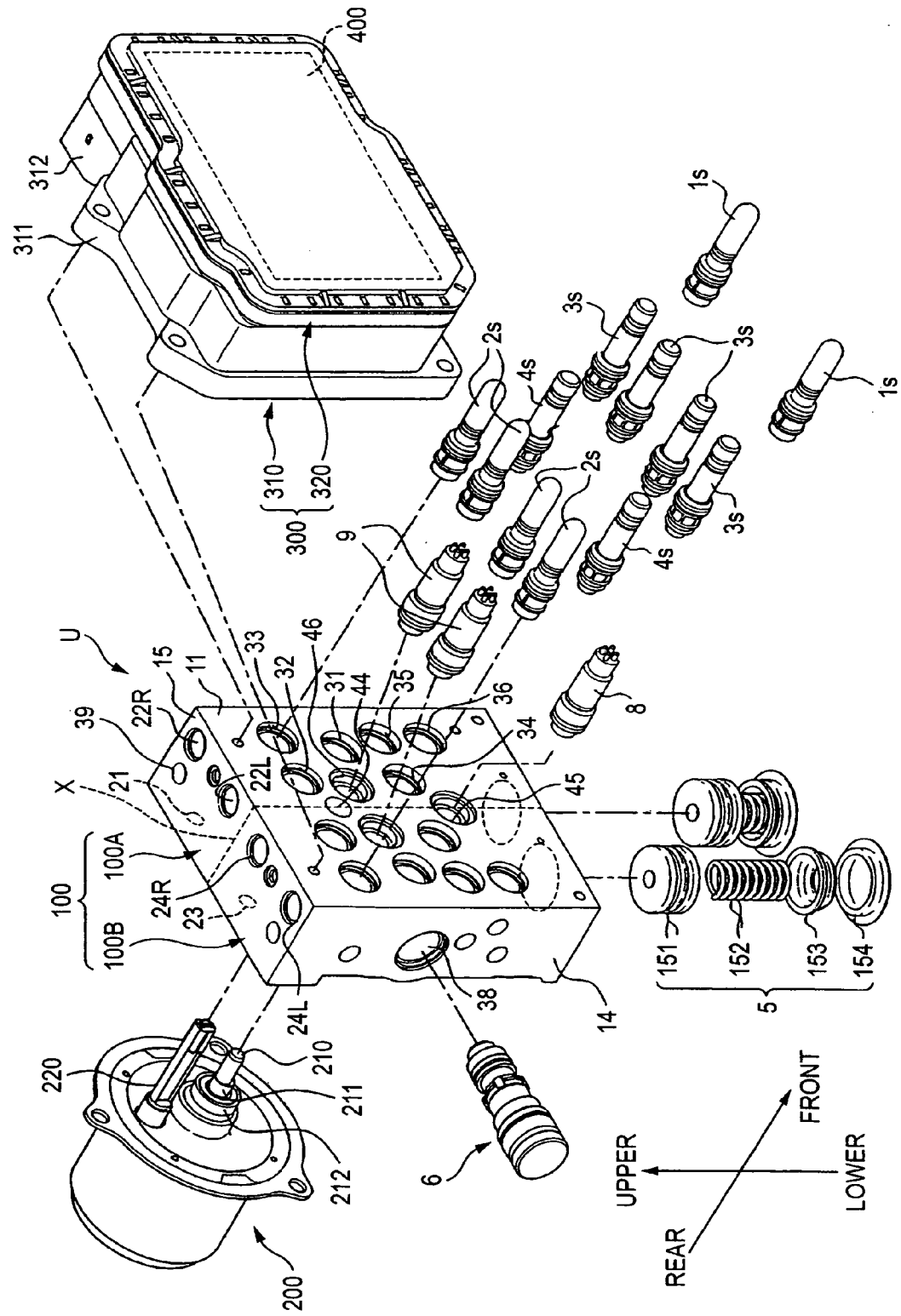
FIG. 1 is an exploded perspective view of a vehicle brake control unit according to an embodiment of the invention.

As shown in FIG. 1, a vehicle brake control unit U (hereinafter, referred to as a "brake control unit U") is configured to include a base body (a pump body) 100, a motor 200 which is assembled on a rear side of the base body 100, a control housing 300 which is assembled on a front side of the base body 100 and a control unit 400 which is accommodated in the control housing 300.

Figure 10:
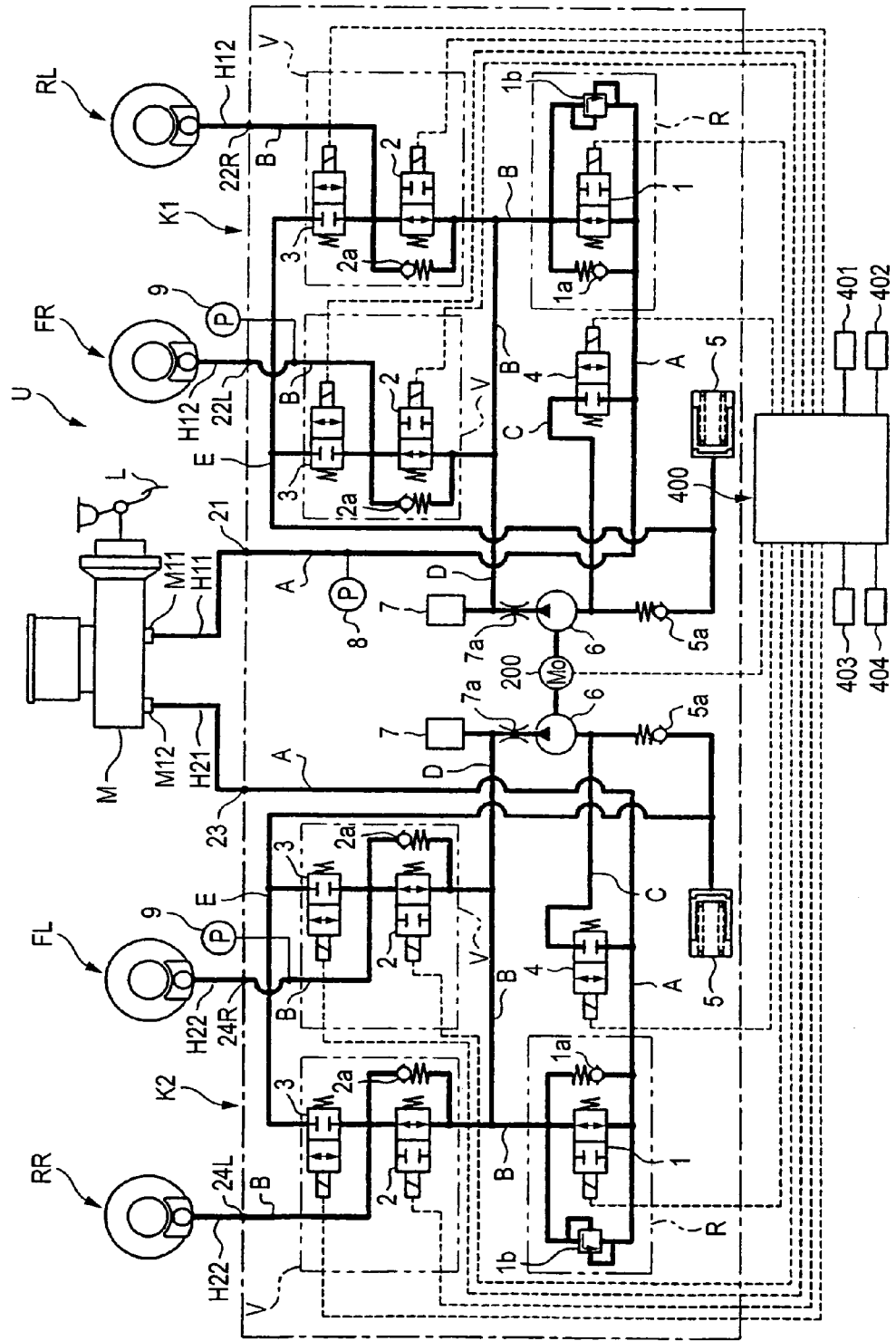
FIG. 10 is a hydraulic pressure circuit diagram of the vehicle brake control unit according to the embodiment of the invention.

The brake control unit U embodies a hydraulic pressure circuit shown in FIG. 10. The brake control unit U includes a brake output circuit K1 for controlling two wheel brakes RL, FR among four wheel brakes RL, FR, FL, RR; and a brake output circuit K2 for controlling the remaining two wheel brakes FL, RR. Accordingly, independent anti-lock brake controls can be performed on four wheels by control valve units V which are provided individually for the wheel brakes RL, FR, FL, RR (that is, two control valve units per brake output circuit). Furthermore, a behavior stabilizing control is enabled by regulators R, suction valves 4 and pumps 6 which are provided for the brake output circuits k1, K2, respectively, working in cooperation with one another.

The brake output circuit K1 applies brakes on left rear and right front wheels. The brake output circuit K1 constitutes a system running from an inlet port 21 to outlet ports 22L, 22R. A piping H11, which reaches an output port M11 of a master cylinder M constituting a hydraulic pressure source, is connected to the inlet port 21, and pipings H12, H12, which reach the wheel brakes RL, FR, respectively, are connected to the outlet ports 22L, 22R, respectively.

The brake output circuit K2 applies brakes on right rear and left front wheels and constitutes a system running from an inlet port 23 to outlet ports 24L, 24R. A piping H21, which reaches an output port M12 of the master cylinder M constituting the same hydraulic pressure source as that for the brake output circuit K1, is connected to the inlet port 23. Further, pipings H22, H22, which reach the wheel brakes RR, FL, respectively, are connected to the outlet ports 24L, 24R, respectively.

Note that there is provided only one master cylinder M. To this master cylinder M, a brake pedal L which constitutes a brake operation element is connected. Namely, the four wheel brakes RL, FR, FL, RR can be applied only by exerting pedal effort on to the single brake pedal L.

Note that since the brake output circuits K1, K2 have substantially the same configuration, in the following description, the brake output circuit K1 will mainly be described, and the brake output circuit K2 will only be described as required.

Provided on the brake output circuit K1 for the front wheel are a regulator R, control valve units V, a suction valve 4, a reservoir 5, a pump 6, a damper 7, an orifice 7a, a hydraulic pressure source side brake hydraulic pressure sensor 8 and a wheel side brake hydraulic pressure sensor 9.

Note that in the following description,

"output hydraulic pressure line A" means a flow path (a fluid line) running from the inlet port 21 to the regulator R;

"wheel hydraulic pressure line B" means a flow path running from the regulator R to the outlet ports 22L, 22R;

"suction hydraulic pressure line C" means a flow path running from the output hydraulic pressure line A to the pump 6;

"discharge hydraulic pressure line D" means a flow path running from the pump 6 to the wheel hydraulic pressure line B; and "release line E" means a flow path running from the wheel hydraulic pressure line B to the suction hydraulic pressure line C.

In addition, an "upstream side" indicates a side which connects to the master cylinder M or a master cylinder M side, and a "downstream side" indicates a side which connects to wheel brake RL/FR (FL/RR) or a wheel brake 1L/FR (FL/RR) side.

The regulator R has:

a function to switch between a state in which a flow of brake fluid from the output hydraulic pressure line A to the wheel hydraulic pressure line B is permitted and a state in which the flow concerned is interrupted; and a function to adjust brake hydraulic pressures in the wheel hydraulic pressure line B and the discharge hydraulic pressure line D to be a predetermined value or less, when the flow of brake fluid from the output hydraulic pressure line A to the wheel hydraulic pressure line B is interrupted.

The regulator R includes a cut-off valve 1, a check valve 1a and a relief valve 1b.

The cut-off valve 1 is made up of a normally open type electromagnetic valve which is interposed between the output hydraulic pressure line A and the wheel hydraulic pressure line B. The cut-off valve 1 permits the brake fluid to flow from an upstream side to a downstream side thereof when in an open state and also the cut-off valve 1 interrupts the flow concerned when in a closed state. The normally open type electromagnetic valve, which makes up the cut-off valve 1, is electrically connected to a control unit 400 via a solenoid coil which drives a valve body thereof. When the solenoid coil is energized depending on a command from the control unit 400, the electromagnetic valve closes to interrupt the flow of brake fluid from the upstream side to the downstream side thereof. On the other hand, when the solenoid coil is deenergized, the electromagnetic valve opens to permit the flow of brake fluid from the upstream side to the downstream side thereof.

The check valve 1a is a valve which permits only a flow of brake fluid from an upstream side to a downstream side thereof and is connected parallel to the cut-off valve 1.

The relief valve 1b is connected parallel to the cut-off valve 1 and opens when a difference between the brake hydraulic pressure in the output hydraulic pressure line A and the brake hydraulic pressure in the wheel hydraulic pressure line B reaches or exceeds a predetermined value.

The control valve units V are provided for the wheel brakes RL, FR, one for each wheel brake. The control valve unit V has a function to switch over among:

a state in which the release line E is interrupted while the wheel hydraulic pressure line B is opened;

a state in which the release line E is opened while the wheel hydraulic pressure line B is interrupted; and a state in which the wheel hydraulic pressure line B and the release line E are interrupted.

The control valve unit V includes an inlet valve 2, a check valve 2a and an outlet valve 3.

The inlet valve 2 is made up of a normally open type electromagnetic valve provided on the wheel hydraulic pressure line B. The inlet valve 2 permits the brake fluid to flow from an upstream side to a downstream side thereof when in an open state and also the inlet valve 2 interrupts the flow concerned when in a closed state. The normally open type electromagnetic valve, which makes up the inlet valve 2, is electrically connected to the control unit 400 via a solenoid coil which drives a valve body thereof, so that the inlet valve 2 closes when the solenoid coil is energized based on a command from the control unit 400 and opens when the solenoid coil is deenergized.

The check valve 2a is a valve which permits only a flow of brake fluid from a downstream side to an upstream side thereof and is connected parallel to the inlet valve 2.

The outlet valve 3 is made up of a normally closed type electromagnetic valve interposed between the wheel hydraulic pressure line B and the release line E. The outlet valve 3 interrupts a flow of brake fluid from a wheel brake RL/FR (FL/RR) side to a reservoir 5 side thereof when in a closed state and the outlet valve 3 permits the flow when in an open state. The normally closed type electromagnetic valve, which makes up the outlet valve 3, is electrically connected to the control unit 400 via a solenoid coil which drives a valve body thereof, so that the electromagnetic valve concerned opens when the solenoid coil is energized based on a command from the control unit 400 and closes when the solenoid coil is deenergized.

The inlet valve 4 switches between a state in which the suction hydraulic pressure line C is opened and a state in which the suction hydraulic pressure line C is interrupted. The inlet valve 4 is made up of a normally closed type electromagnetic valve provided on the suction hydraulic pressure line C. The normally closed type electromagnetic valve, which makes up the suction valve 4, is electrically connected to the control unit 400 via a solenoid coil which drives a valve body thereof, so that the electromagnetic valve concerned opens when the solenoid coil is energized based on a command from the control unit 400 and closes when the solenoid coil is deenergized.

The reservoir 5 is provided on the release line E and has a function to temporarily store brake fluid which is relieved by each outlet valve 3 being opened. In addition, a check valve 5a is interposed between the reservoir 5 and the pump 6 for permitting only a flow of brake fluid from a reservoir 5 side to a pump 6 side thereof.

The pump 6 is interposed between the suction hydraulic pressure line C which communicates with the output hydraulic pressure line A and the discharge hydraulic pressure line D which communicates with the wheel hydraulic pressure line B. The pump 6 is driven by the rotational force of the motor 200 and sucks the brake fluid stored temporarily in the reservoir 5 to discharge it to the discharge hydraulic pressure line D. In addition, when the cut-off valve 1 is in a closed state and the suction valve 4 is in an open state, the pump 6 sucks brake fluid stored in the master cylinder M, the output hydraulic pressure line A, the suction hydraulic pressure line C and the reservoir 5 to discharge it to the discharge hydraulic pressure line D, whereby a brake hydraulic pressure produced by operating the brake pedal L can be increased. Furthermore, the pump 6 can allow brake hydraulic pressure to be applied to the wheel brakes RL, FR (FL, RR) even in a state that the brake pedal L is not operated.

In addition, the damper 7 and the orifice 7a cooperate with each other to attenuate the pulsation of brake fluid discharged from the pump 6.

The hydraulic pressure source side brake hydraulic pressure sensor 8 measures a brake hydraulic pressure in the output hydraulic pressure line A, that is, magnitude of brake hydraulic pressure in the master cylinder M. Only one hydraulic pressure source side brake hydraulic pressure sensor 8 is disposed for one of the brake output circuits (in the case of this embodiment, the brake output circuit K1), and no such sensor is provided on the other brake output circuit (in the case of this embodiment, the brake output circuit K2). The value of the brake hydraulic pressure measured by the hydraulic pressure source side brake hydraulic pressure sensor 8 is successively captured into the control unit 400, and whether or not a brake hydraulic pressure is outputted from the master cylinder M, that is, whether or not the brake pedal L is depressed is determined by the control unit 400. Furthermore, the behavior stabilizing control is implemented based on the magnitude of the brake hydraulic pressure measured by the hydraulic pressure source side brake hydraulic pressure sensor 8.

The wheel side brake hydraulic pressure sensor 9 measures magnitude of brake hydraulic pressure applied to the wheel brake FR (FL) of the front wheel. The value of the brake hydraulic pressure measured by the wheel side brake hydraulic pressure sensor 9 is successively captured into the control unit 400, so that the anti-lock brake control and the behavior stabilizing control are implemented based on the magnitude of the brake hydraulic pressure measured by the wheel side brake hydraulic pressure sensor 9.

The motor 200 is a common power supply for the pump 6 provided on the brake output circuit K1 on the front wheel side and the pump 6 provided on the brake output circuit K2 on the rear wheel side and operates based on a command from the control unit 400.

The control unit 400 controls the opening and closing of the cut-off valves 1 of the regulators R, the inlet valves 2 and the outlet valves 3 of the control valve units V and the suction valves 4 and the operation of the motor 200 based on outputs from the hydraulic pressure source side brake hydraulic pressure sensor 8, the wheel side brake hydraulic pressure sensors 9, a wheel speed sensor 401 for the right front wheel, a wheel speed sensor 402 for the left front wheel, a wheel speed sensor 403 for the right rear wheel and a wheel speed sensor 404 for the left rear wheel.

Next, referring to the hydraulic pressure circuit in FIG. 10, a normal brake control, an anti-lock brake control and a behavior stabilizing control which are realized by the control unit 400 will be described. Note that in the embodiment, which will be described below, a description will be made by taking a front-wheel-drive vehicle as an example.

(Normal Brake Control)

In a normal brake control that is carried out when the wheels are unlikely to lock up, the plurality of solenoid coils which drives the plurality of electromagnetic valves are all deenergized by the control unit 400. Namely, in the normal brake control, the cut-off valves 1 and the inlet valves 2 are in the open state, while the outlet valves 3 and the suction valves 4 are in the closed state.

When the driver pushes on the brake pedal L in the situation like this, a brake hydraulic pressure produced by brake effort produced by the brake pedal L so pushed is transmitted to the wheel brakes FL, RR, RL, FR as it is to thereby slow the wheels.

When the normal brake control that has been described above is performed, since the brake hydraulic pressures in the wheel hydraulic pressure lines B which connect to the right front and left front wheel brakes FR, FL are actually measured by the wheel side brake hydraulic pressure sensors 9, 9, respectively, the fact can be verified that a preferred brake hydraulic pressure is being applied to the wheel brakes FR, FL.

(Anti-Lock Brake Control)

An anti-lock brake control is executed when the wheels are likely to lockup and is realized by controlling the control valve units V which are associated, respectively, with the wheel brakes FL, RR, RL, FR of the wheels which are likely to lock up so as to selectively reduce, increase or hold constant the brake hydraulic pressures applied to the wheel brakes FL, RR, RL, FR. Whether the brake hydraulic pressures are selectively reduced, increased or held constant is determined by the control unit 400 based on wheel speeds obtained by the wheel speed sensor 401 for the right front wheel, the wheel speed sensor 402 for the left front wheel, the wheel speed sensor 403 for the right rear wheel and the wheel speed sensor 404 for the left rear wheel.

When the wheels are about to lock up while the brake pedal L is being depressed, an anti-lock brake control is started by the control unit 400.

Followings, the operation of the anti-lock brake control will be described assuming that the right front wheel (the wheel which is caused to slow by the wheel brake FR) is about to lock up.

When it is determined by the control unit 400 that the brake hydraulic pressure applied to the wheel brake FR is to be reduced, the wheel hydraulic pressure line B is interrupted and the release line E is opened by the control valve unit V associated with the wheel brake FR. Specifically, the inlet valve 2 is energized to be put in the closed state by the control unit 400, while the outlet valve 3 is energized to be put in the open state by the control unit 400. When the valves are controlled in this way, the brake fluid in the wheel hydraulic pressure line B which communicates with the wheel brake FR flows into the reservoir 5 by way of the release line E, and as a result, the brake hydraulic pressure applied to the wheel brake FR is reduced. As this occurs, the brake hydraulic pressure in the wheel hydraulic pressure line B is measured by the wheel side brake hydraulic pressure sensor 9, and the measured value is then captured into the control unit 400.

In addition, when the anti-lock brake control is executed, the motor 200 is driven by the control unit 400 so as to actuate the pump 6, so that brake fluid stored in the reservoir 5 is caused to flow back to the wheel hydraulic pressure line B via the discharge hydraulic pressure line D.

In addition, when it is determined by the control unit 400 that the brake hydraulic pressure applied to the wheel brake FR is to be held constant, both the wheel hydraulic pressure line B and the release line E are interrupted by the control valve unit V associated with the wheel brake FR. Specifically, the inlet valve 2 is energized to be put in the closed state by the control unit 400, while the outlet valve 3 is deenergized to be put in the closed state by the control unit 400. When the valves are controlled in this way, a situation occurs in which the brake fluid is confined within a flow path which is closed by the wheel brake FR, the inlet valve 2 and the outlet valve 3, and as a result, the brake hydraulic pressure applied to the wheel brake FR is held constant.

Furthermore, when it is determined by the control unit 400 that the brake hydraulic pressure applied to the wheel brake FR is to be increased, the wheel hydraulic pressure line B is opened and the release line E is interrupted by the control valve unit V associated with the wheel brake FR. Specifically, the inlet valve 2 is deenergized to be put in the open state by the control unit 400, while the outlet valve 3 is deenergized to be put in the closed state by the control unit 400. When the valves are controlled in this way, the brake hydraulic pressure produced by brake effort produced by the brake pedal L is applied directly to the wheel brake FR, and as a result, the brake hydraulic pressure applied to the wheel brake FR is increased.

When the anti-lock brake control that has been described above is executed, since the brake hydraulic pressure in the wheel hydraulic pressure line B which connects to the right front wheel brake FR is actually measured by the wheel side brake hydraulic pressure sensor 9, a detailed hydraulic pressure control can be performed based on the brake hydraulic pressure so measured in the control unit 400. Specifically, while sensing the brake hydraulic pressure within the wheel hydraulic pressure line B, the outlet valve 3 is controlled to be opened or closed so that the hydraulic pressure concerned is not reduced excessively. In addition, the opening and the opening time of the outlet valve 3 may be set such that the brake hydraulic pressure is not reduced excessively. When the valve is controlled in this way, it becomes possible to perform a highly accurate brake control based on the magnitude of the brake hydraulic pressure which has been measured by the wheel side brake hydraulic pressure sensor 9, and when it is determined that the situation is over in which the wheel concerned is about to lock up and the brake hydraulic pressure which is being applied to the wheel brake FR be increased, the brake hydraulic pressure can be returned to a desired pressure on the spot. In addition, also when it is determined that the brake hydraulic pressure which is being applied to the wheel brake FR is to be held constant, by controlling the inlet valve 2 and the outlet valve 3 to be opened or closed while actually measuring the brake hydraulic pressure which is being applied to the wheel brake, a most suitable brake hydraulic pressure to the wheel brake FR can be held in an ensured fashion and with ease.

(Behavior Stabilizing Control)

A behavior stabilizing control is such as to prevent disturbance to the behavior of the vehicle which occurs due to a change in driving conditions which occurs when running in rain or cornering on a snow-covered road.

Depending upon the conditions of the vehicle, a behavior stabilizing control such as a skid control or traction control is started by the control unit 400. Note that in the following description, a situation is assumed in which the behavior of the vehicle is stabilized by causing the right front wheel (the wheel which is caused to slow by the wheel brake FR) to slow when the brake pedal L (refer to FIG. 10) is not operated.

When it is determined by the control unit 400 that the right front wheel is to be caused to slow with the brake pedal L not operated, the cut-off valve 1 is energized to be put in the closed state by the control unit 400, while the suction valve 4 is energized to be put in the open state by the control unit 400. Furthermore, the inlet valves 2 which are not associated with the right front wheel are energized to be put in the closed state by the control unit 400, and in this state, the motor 200 is actuated to drive the pump 6. By this control, brake fluid stored in the master cylinder M, the output hydraulic pressure line A and the suction hydraulic pressure line C is caused to flow only into the wheel hydraulic pressure line B which communicates with the wheel brake FR by way of the pump 6 and the discharge hydraulic pressure line D. As a result, the brake hydraulic pressure is applied to the wheel brake FR, whereby the right front wheel is caused to slow.

Note that when a difference between the brake hydraulic pressure in the output hydraulic pressure line A and the brake hydraulic pressure in the wheel hydraulic pressure line B becomes equal to or more than a predetermined value, brake fluid within the wheel hydraulic pressure line B is relieved to the output hydraulic pressure line A by the action of a relief valve 1b.

In addition, since pulsation produced in the discharge hydraulic pressure line D or the like due to the operation of the regulator R is absorbed to be suppressed by the cooperation of the damper 7 and the orifice 7a, the operation noise attributed to the pulsation is reduced.

When executing the behavior stabilizing control that has been described above, since the brake hydraulic pressure in the wheel hydraulic pressure line B which connects to the right front wheel brake FR is actually measured by the wheel side brake hydraulic pressure sensor 9, a delicate hydraulic pressure control can be performed by the control unit 400 so that the brake hydraulic pressure within the wheel hydraulic pressure line B becomes a desired value, thereby making it possible to implement a highly accurate brake control.

Next, a specific construction of the brake control unit U will be described in detail by reference to FIGS. 1 to 3.

As has been described above, the brake control unit U is configured to include the base body (the pump body) 100, the motor 200, the control housing 300 and the control unit 400.

The base body 100 is made up of an extruded material or a cast product which is formed substantially into a rectangular parallelepiped body and is made of aluminum alloy. A front side 11 of the obtained one is extruded or cast into a flat plane substantially free from irregularities. Two flow path configuring portions 100A, 100B are formed in the base body 100 so as to correspond to the two brake output circuits K1, K2 (refer to FIG. 10), respectively. Specifically, the flow path configuring portion 100A associated with the brake output circuit K1 is formed in a right-hand half portion (a region which lies further rightwards than a center line X shown in the figures concerned) of the base body 100 as viewed from the side of the front side 11, while the flow path configuring portion 100B associated with the brake output circuit K2 is formed in a left-hand half portion (a region which lies further leftwards than the center line X shown in the figures concerned) of the base body 100. In this embodiment, the flow path configuring portions 100A, 100B are formed substantially laterally symmetrical, and their interior configurations are the same.

Figures 5A, 5B:
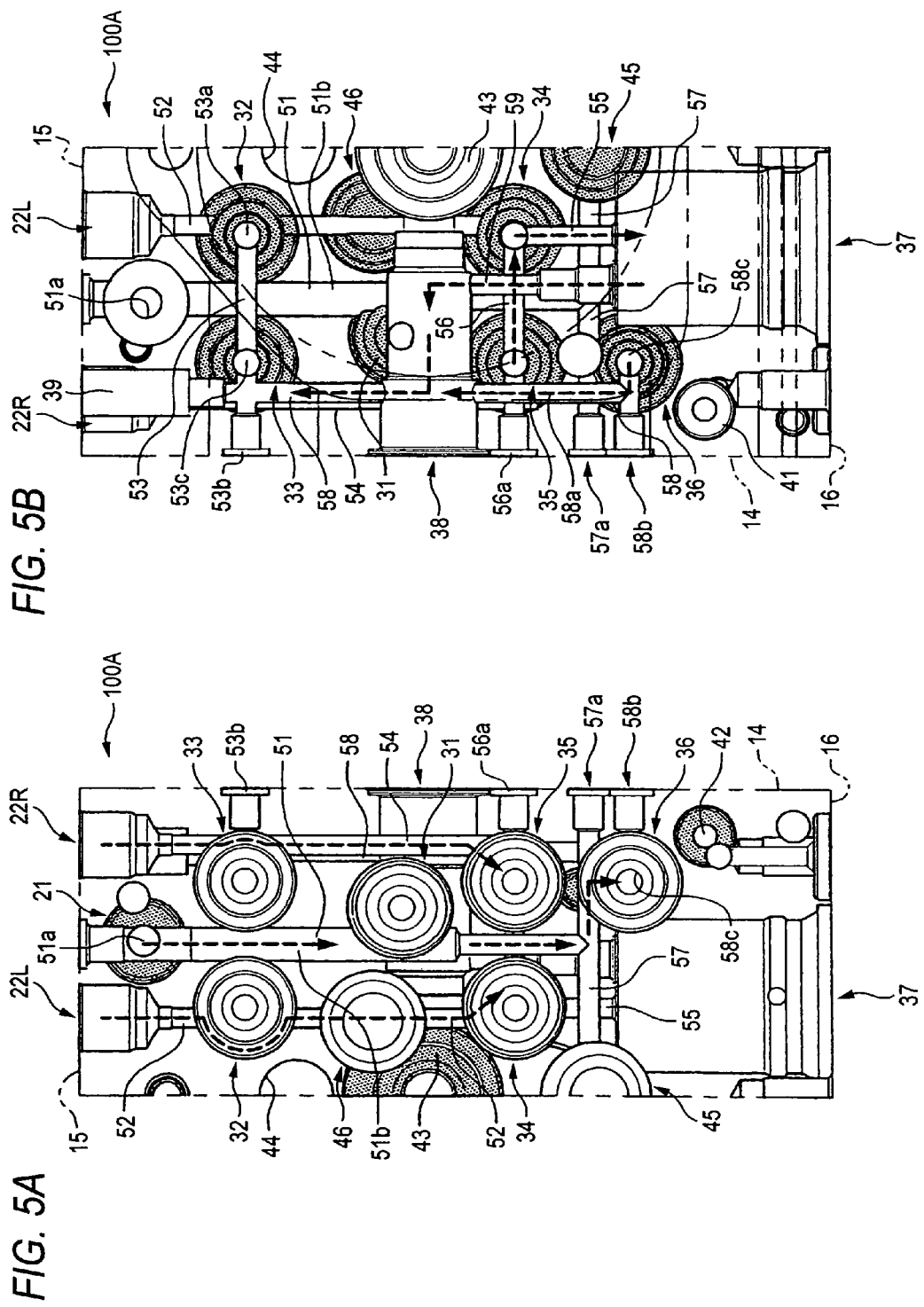
FIG. 5A is a front perspective projection of a flow path configuring portion of the vehicle brake control unit according to the embodiment of the invention.
FIG. 5B is a rear perspective projection of a flow path configuring portion of the vehicle brake control unit according to the embodiment of the invention.

In addition to the inlet port 21 which opens in a rear side 12 (refer to FIG. 3) and the two outlet ports 22L, 22R which open in an upper side 15, the flow path configuring portion 100A includes:

a central mounting hole 31 which lies at almost the same height as a bearing hole 43 into which an output shaft 210 (refer to FIG. 1) of the motor 200 is inserted, as shown in FIG. 5A;

a central flow path 51 (refer to FIG. 5A) which originates from the inlet port 21 and passes through the central mounting hole 31 vertically;

a first inner mounting hole 32 and a first outer mounting hole 33 which lie upstream side of the central mounting hole 31 and opposes each other via the central flow path 51;

a second inner mounting hole 34 and a second outer mounting hole 35 which lie downstream side of the central mounting hole 31 and opposes each other via the central flow path 51; and a third mounting hole 36 which is disposed below the second outer mounting hole 35;

a reservoir hole 37 which opens in a lower side 16;

a pump hole 38 which opens in a lateral side 14;

a damper hole 39 (refer to FIG. 5B) which opens the upper side 15; and a wheel side sensor mounting hole 46 which is disposed on an extension of the outlet port 22L of the outlet ports between the first inner mounting hole 32 and the second inner mounting hole 34.

To the wheel side sensor mounting hole 46, the wheel side brake hydraulic pressure sensor 9 (refer to FIGS. 1 and 10) is mounted for measuring a brake hydraulic pressure outputted to the wheel brake FR (in this embodiment, the right front wheel brake) of the wheel brakes.

Figure 2:
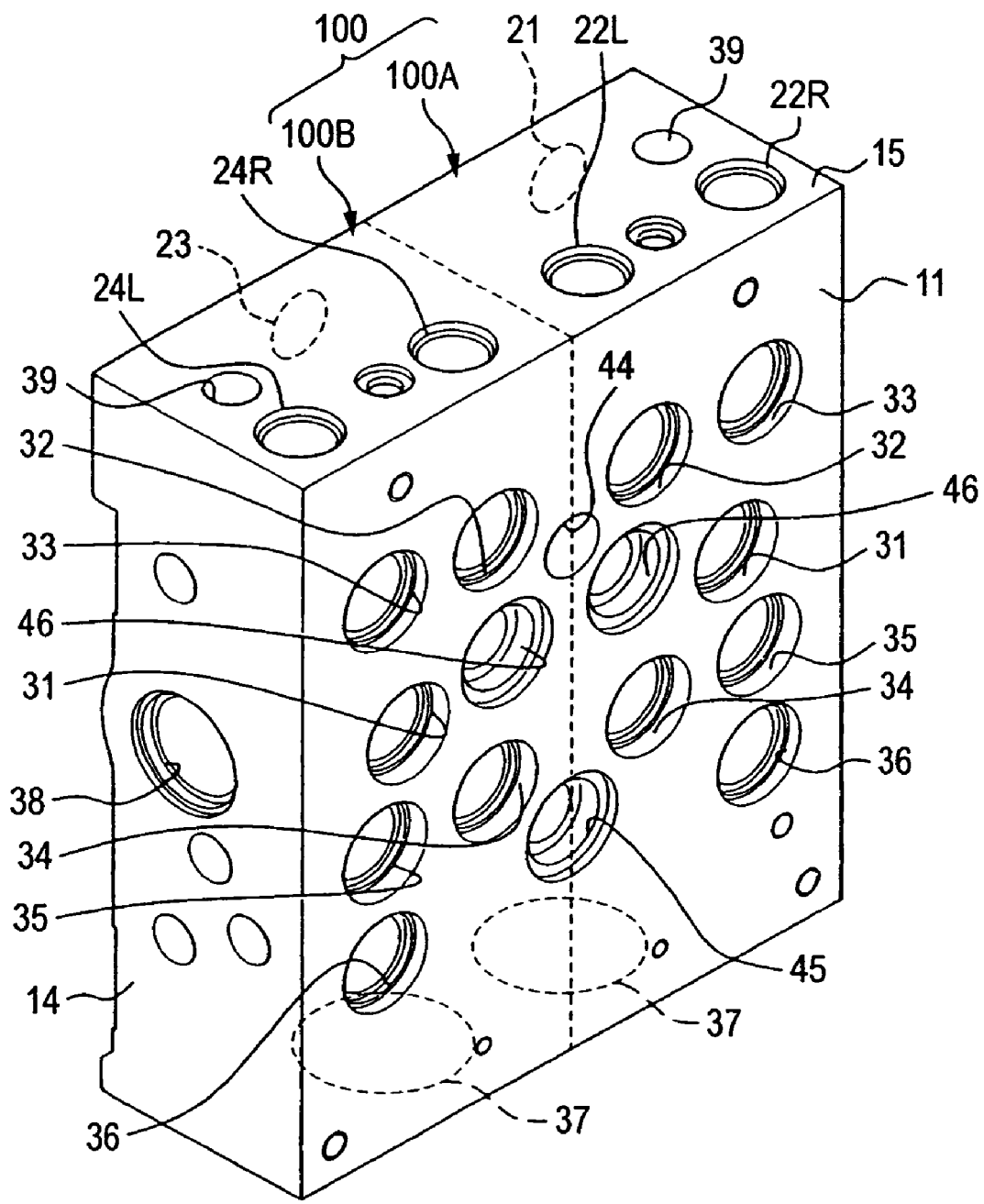
FIG. 2 is a perspective view of a base body of the vehicle brake control unit of the embodiment of the invention.
Figure 3:
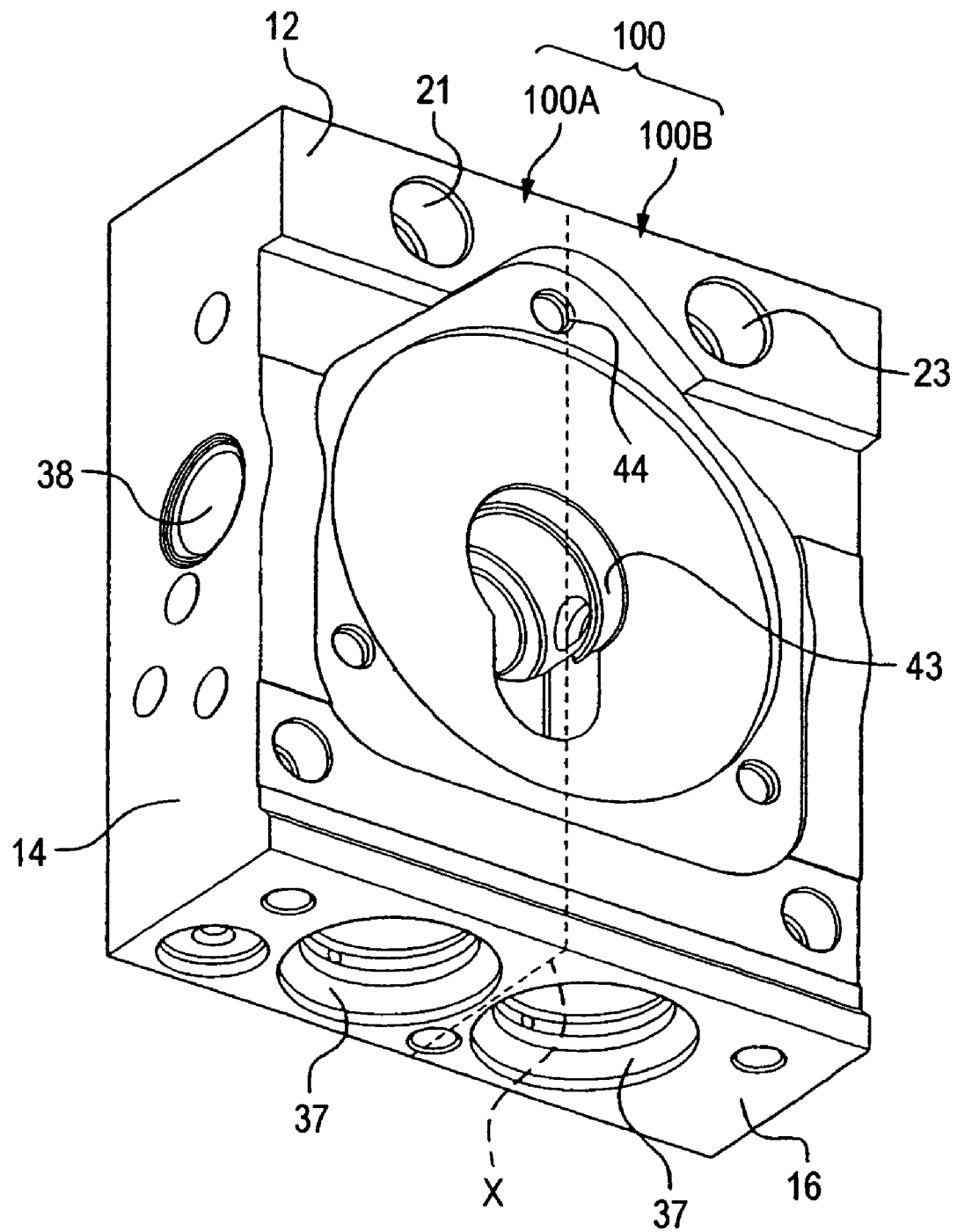
FIG. 3 is a perspective view of the base body of the vehicle brake control unit of the embodiment of the invention.

Note that as shown in FIGS. 1 and 2, the central mounting hole 31, the first inner mounting hole 32, the first outer mounting hole 33, the second inner mounting hole 34, the second outer mounting hole 35 and the third mounting hole 36 open in the same plane of the front side 11 of the flow path configuring portion 100A. In addition, in this embodiment, hole diameters of the central mounting hole 31, the first inner mounting hole 32, the first outer mounting hole 33, the second inner mounting hole 34, the second outer mounting hole 35 and the third mounting hole 36 are all made the same in size.

In addition, in this embodiment, it is understood that a piping H12 (refer to FIG. 10) which reaches the wheel brake FR is connected to the outlet port 22L which lies inboards (leftwards in FIG. 5A), while a piping H12 (refer to FIG. 10) which reaches the wheel brake RL is connected to the outlet port 22R which lies outboards (rightwards in FIG. 5A).

Figure 6A:
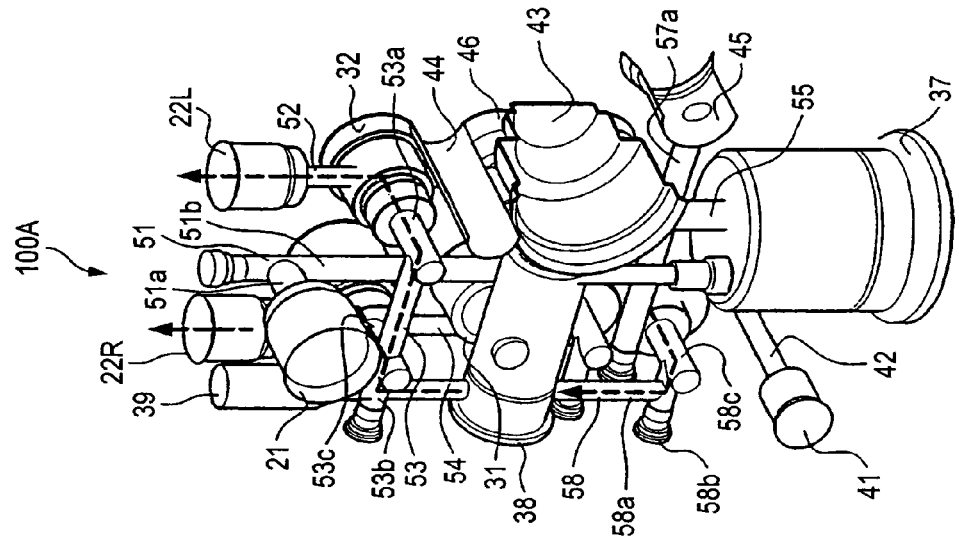
FIG. 6A is a front perspective view showing an interior of the flow path configuring portion of the vehicle brake control unit according to the embodiment of the invention so as to visualize mounting holes and flow paths formed therein.
Figure 6B:
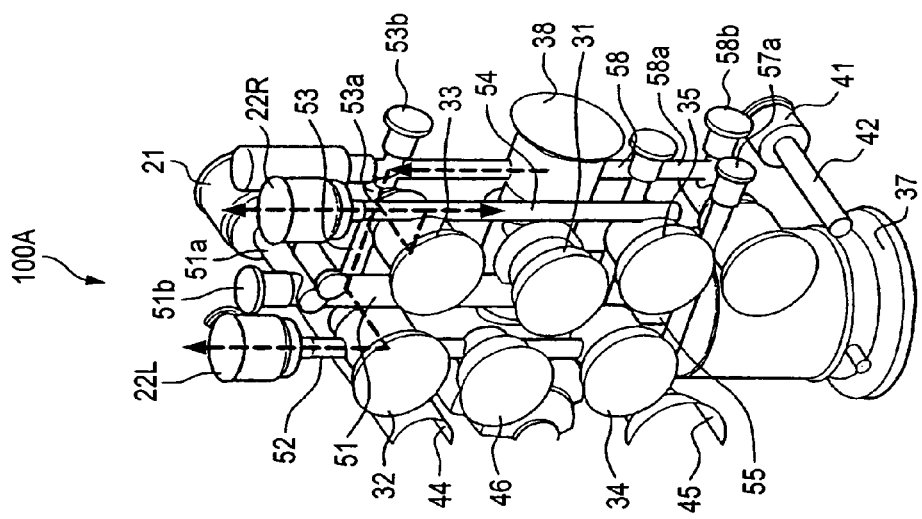
FIG. 6B is a rear perspective view showing an interior of the flow path configuring portion of the vehicle brake control unit according to the embodiment of the invention so as to visualize mounting holes and flow paths formed therein.
Figure 7:
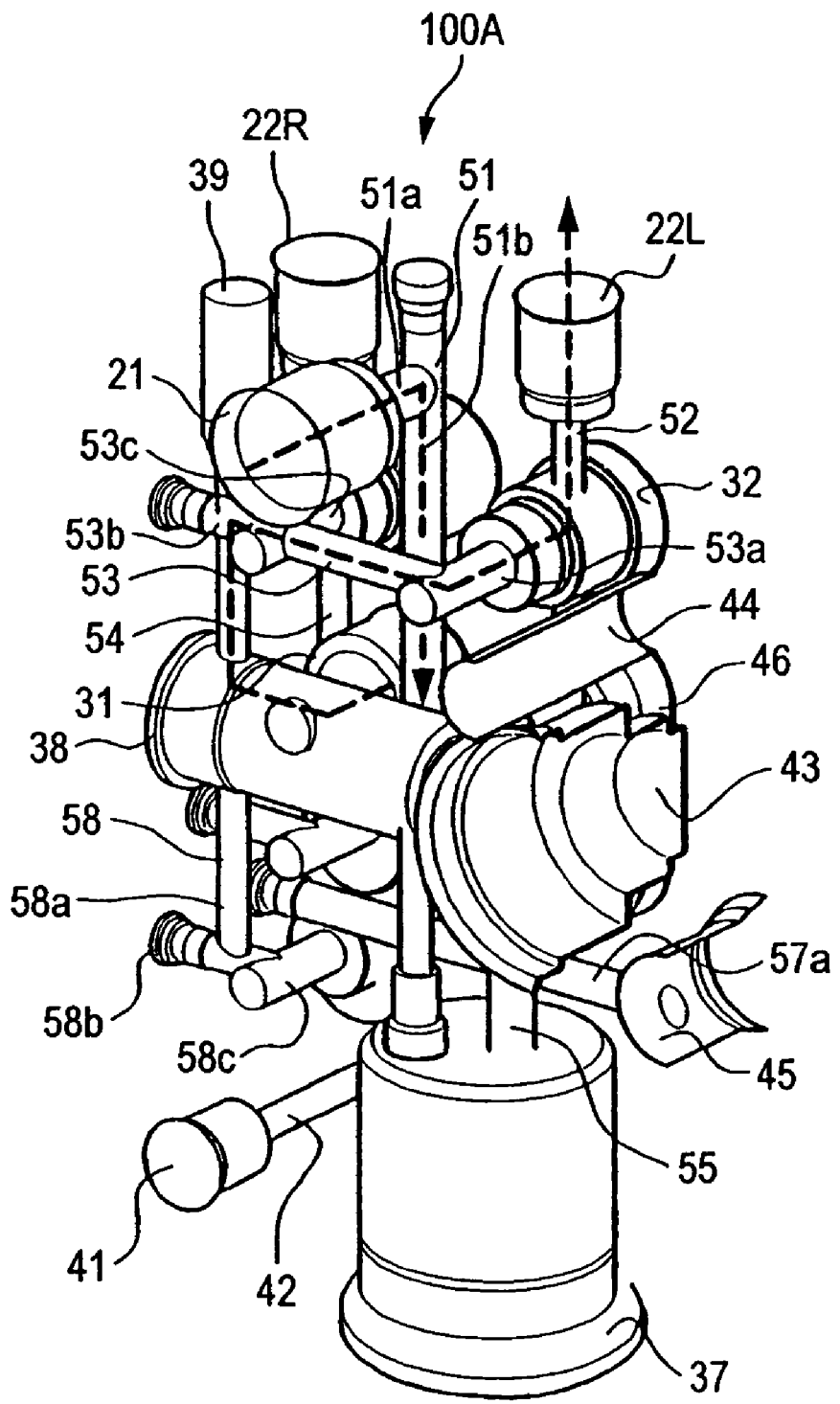
FIG. 7 is a perspective view showing the interior of the flow path configuring portion of the vehicle brake control unit according to the embodiment of the invention so as to visualize the mounting holes and flow paths formed therein to illustrate the flow of brake fluid, as viewed from the rear side.

As shown in FIGS. 6A, 6B and 7, the inlet port 21 is a bottomed cylindrical hole and communicates with the central mounting hole 31 via the central flow path 51 (hereinafter, referred to as a "first flow path"). The first flow path 51 is made up of a horizontal hole 51a bored from a bottom side of the inlet port 21 towards the front side of the flow path configuring portion 100A and a vertical hole 51b bored downwards from the upper side 15 of the flow path configuring portion 100A. The vertical hole 51b intersects with the horizontal hole 51a and passes through a side wall of the central mounting hole 31 vertically (refer to FIG. 5A).

As shown in FIGS. 6A, 6B and 7, the outlet port 22L, which lies inboards, is a bottomed cylindrical hole and communicates with the first inner mounting hole 32 via a second flow path 52. As shown in FIGS. 5A and 5B, the second flow path 52 is made up of a vertical hole bored from a bottom side of the outlet port 22L, which lies inboards, towards the lower side 16 of the flow path configuring portion 100A and passes through a side wall of the first inner mounting hole 32 and a side wall of the wheel side sensor mounting hole 46 vertically to reach the second inner mounting hole 34.

As shown in FIGS. 6A, 6B and 7, the outlet port 22R, which lies outboards, is a bottomed cylindrical hole and communicates with the first outer mounting hole 33 via a fourth flow path 54. As shown in FIGS. 5A and 5B, the fourth flow path 54 is made up of a vertical hole bored from a bottom side of the outlet port 22R, which lies outboards, towards the lower side 16 of the flow path configuring portion 100A and passes through a side wall of the first outer mounting hole 33 vertically to reach the second outer mounting hole 35.

The central mounting hole 31 is a bottomed, stepped cylindrical hole into which a normally closed type electromagnetic valve 4s (refer to FIG. 1) is mounted which constitutes the suction valve 4 (refer to FIG. 10) and directly communicates with a side portion of the pump hole 38 at a bottom portion thereof. In addition, a connecting portion between the bottom portion of the central mounting hole 31 and the side portion of the pump hole 38 corresponds to the suction hydraulic pressure line C shown in FIG. 10.

The first inner mounting hole 32 is a bottomed, stepped cylindrical hole into which a normally open type electromagnetic valve 2s (refer to FIG. 1) is mounted, which constitutes the inlet valve 2 (refer to FIG. 10) of the control valve unit V associated with the wheel brake FR. The first inner mounting hole 32 communicates with the second inner mounting hole 34 via the second flow path 52 as shown in FIG. 5A and communicates with the first outer mounting hole 33 via a third flow path 53 as shown in FIG. 5B. The third flow path 53 is, as shown in FIG. 6B, made up of:

a horizontal hole 53a bored from a bottom side of the first inner mounting hole 32 towards the rear side of the flow path configuring portion 100A;

a horizontal hole 53b bored from the lateral side 14 (refer to FIG. 5B) of the flow path configuring portion 100A so as to reach the horizontal hole 53a; and a horizontal hole 53c (refer to FIG. 5B) bored from a bottom side of the first outer mounting hole 33 towards the rear side 12 of the flow path configuring portion 100A so as to reach the horizontal hole 53b.

An opening in the horizontal hole 53b is closed tightly by a plug member, not shown. Note that, the second flow path 52 and the third flow path 53 correspond to the wheel hydraulic pressure line B shown in FIG. 10.

The first outer mounting hole 33 is a bottomed, stepped cylindrical hole into which a normally open type electromagnetic valve 2s (refer to FIG. 1) is mounted, which constitutes the inlet valve 2 (refer to FIG. 10) of the control valve unit V associated with the wheel brake RL. Further, the first outer mounting hole 33 communicates with the second outer mounting hole 35 via the fourth flow path 54 as shown in FIG. 5A. Note that the fourth flow path 54 corresponds to the wheel hydraulic pressure line B shown in FIG. 10.

The second inner mounting hole 34 is a bottomed, stepped cylindrical hole into which a normally closed type electromagnetic valve 3s is mounted, which constitutes the outlet valve 3 (refer to FIG. 10) of the control valve unit V associated with the wheel brake FR. The second inner mounting hole 34 communicates with the reservoir hole 37 via a fifth flow path 55 which originates from a bottom portion thereof as shown in FIG. 5B. The fifth flow path 55 is made up of a vertical hole bored from a bottom side of the reservoir hole 37 so as to reach the bottom portion of the second inner mounting hole 34.

The second outer mounting hole 35 is a bottomed, stepped cylindrical hole into which a normally closed type electromagnetic valve 3s is mounted, which constitutes the outlet valve 3 (refer to FIG. 10) of the control valve unit V associated with the wheel brake RL. Further, the second outer mounting hole 35 communicates with a bottom portion of the second inner mounting hole 34 via a sixth flow path 56 and also communicates with the reservoir hole 37 via the fifth flow path 55, as shown in FIG. 5B. The sixth flow path 56 passes through a bottom portion of the second outer mounting hole 35 horizontally and is made up of a horizontal hole 56a bored from the lateral side 14 of the flow path configuring portion 100A so as to reach the bottom portion of the second inner mounting hole 34. Note that an opening of this horizontal hole 56a is closed tightly by a plug member, not shown.

The third mounting hole 36 is a bottomed, stepped cylindrical hole into which a normally open type electromagnetic valve is (refer to FIG. 1) is mounted, which constitutes the cut-off valve 1 (refer to FIG. 10). The third mounting hole 36 communicates with the inlet portion 21 via the first flow path 51 and a seventh flow path 57 at a side wall thereof as shown in FIG. 5A and, also communicates with the first inner mounting hole 32 and the first outer mounting hole 33 via an eighth flow path 58 and the third flow path 53, respectively, at a bottom portion thereof as shown in FIG. 5B. The seventh flow path 57 passes through the side wall of the third mounting hole 36 horizontally and is made up of a horizontal hole 57a bored from the lateral side 14 of the flow path configuring portion 100A so as to intersect the first flow path 51. Note that the horizontal hole 57a reaches a hydraulic pressure source side sensor mounting hole 45, which will be described later.

The eighth flow path 58 is made up of:

a vertical hole 58a bored from a bottom side of the damper hole 39 so as to intersect the horizontal hole 53b of the third flow path 53 and to pass through a discharge side of the pump hole 38 vertically so as to reach the vicinity of the third mounting hole 36;

a horizontal hole 58b bored from the lateral side 14 of the flow path configuring portion 100A so as to intersect the vertical hole 58a and to reach a bottom portion of the third mounting hole 36; and a horizontal hole 58c (refer to FIG. 6B) bored from a bottom side of the third mounting hole 36 so as to reach the horizontal hole 58b.

Note that openings of the vertical hole 58a and the horizontal hole 58b are closed tightly by plug members, not shown, respectively. Here, the first flow path 51 and the seventh flow path 57 correspond to the output hydraulic pressure line A shown in FIG. 10, and the eighth flow path 58, the third flow path 53 and the second flow path 52 correspond to the wheel hydraulic pressure line B shown in FIG. 10.

Figure 9:
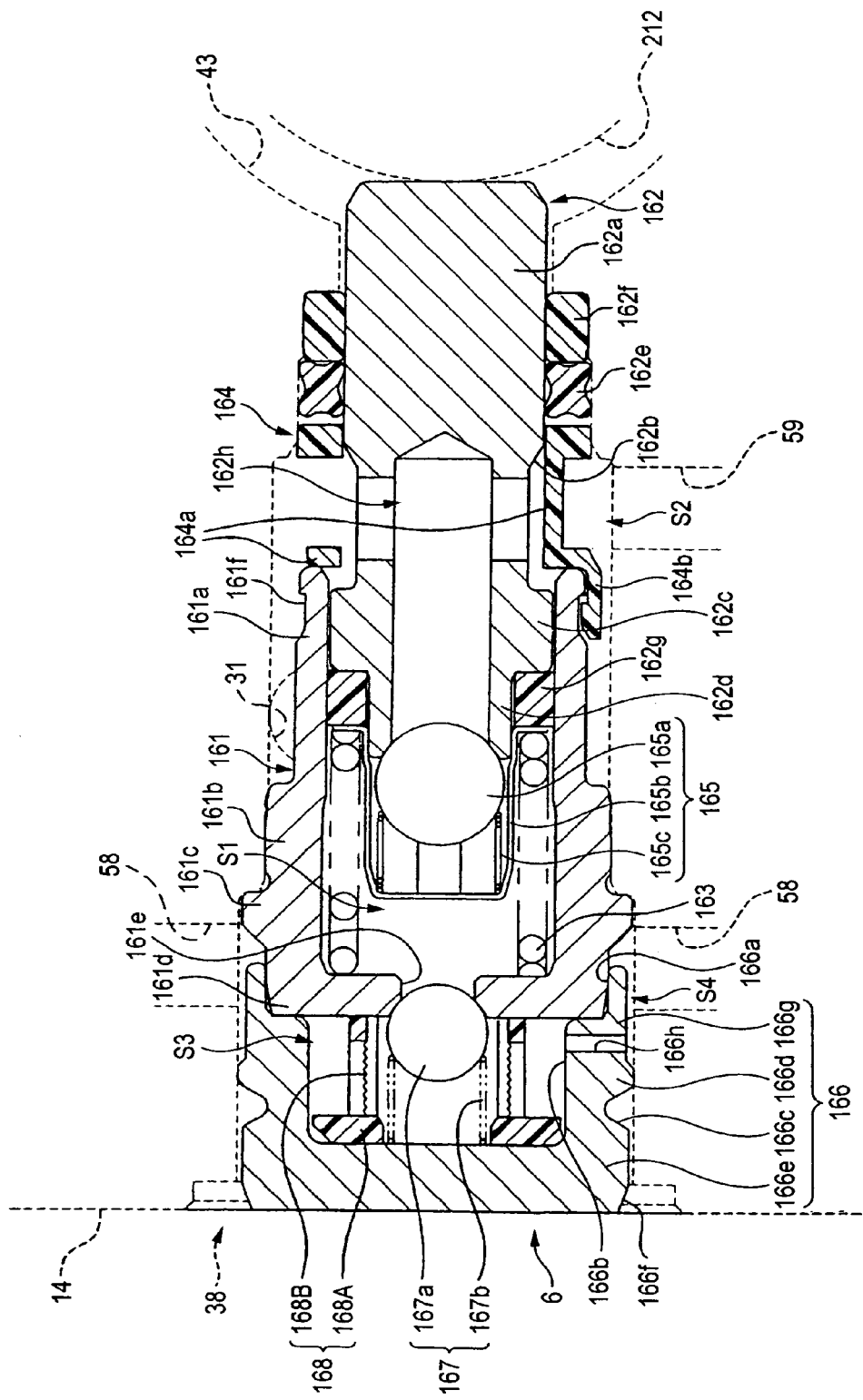
FIG. 9 is a sectional view of a pump.

The reservoir hole 37 is a bottomed cylindrical hole into which the reservoir 5 (refer to FIGS. 1, 10) is mounted and communicates with the pump hole 38 via a ninth flow path 59 as shown in FIG. 5B. The ninth flow path 59 is made up of a vertical hole bored from a bottom side of the reservoir hole 37 so as to reach a suction side of the pump hole 38. Note that a one-way valve which constitutes the check valve 5a which is shown in FIGS. 9 and 10 is mounted on the ninth flow path 59. In addition, the fifth flow path 55, the sixth flow path 56 and the ninth flow path 59 correspond to the release line E shown in FIG. 10.

The pump hole 38 is a stepped cylindrical hole into which the pump 6 (refer to FIGS. 1, 10) is mounted, is formed so that a center line thereof passes through the center of the bearing hole 43 and communicates with the damper hole 39 via the eighth flow path 58. The vertical hole 58a of the eighth flow path 58 passes through a discharge side of the pump hole 38 vertically. Note that the eighth flow path 58 corresponds to the discharge hydraulic pressure line D shown in FIG. 10.

The damper hole 39 is a cylindrical hole which constitutes the damper 7 (refer to FIG. 10), and an opening thereof is closed tightly by a lid member, not shown.

The wheel side sensor mounting hole 46 is a hole into which the wheel side brake hydraulic pressure sensor 9 (refer to FIGS. 1, 10) is mounted, exhibits a bottomed cylindrical shape and is disposed on a downward extension of the outlet port 22L (in this embodiment, provided on the side lying inboards) of the outlet ports between the first inner mounting hole 32 and the second inner mounting hole 34. Specifically, the wheel side sensor mounting hole 46 is connected to the second flow path 52 with which a bottom portion thereof communicates below the outlet portion 22L and communicates with the outlet port 22L.

As shown in FIG. 1, the hydraulic pressure source side sensor mounting hole 45, into which the hydraulic pressure source side brake hydraulic pressure sensor 8 is mounted, is formed so as to straddle the center line X (refer to FIG. 1) of the base body 100 to extend to the flow path configuring portions 100A, 100B in a central portion (a boundary portion between the flow path configuring portions 100A, 100b) of the front side of the base body 100 which lies below the bearing hole 43 (refer to FIG. 5A). The hydraulic pressure source side sensor mounting hole 45 is formed into a bottomed cylindrical shape, is disposed in such a manner that a central portion thereof is positioned on the center line X (refer to FIG. 1) and is made to open to the front side of the base body 100. In addition, as shown in FIG. 5A, the seventh flow path 57 is made to open to a side wall of the hydraulic pressure source side sensor mounting hole 45, whereby the hydraulic pressure source side sensor mounting hole 45 communicates with the inlet port 21 via the seventh flow path 57 and the first flow path 51.

Figure 4:
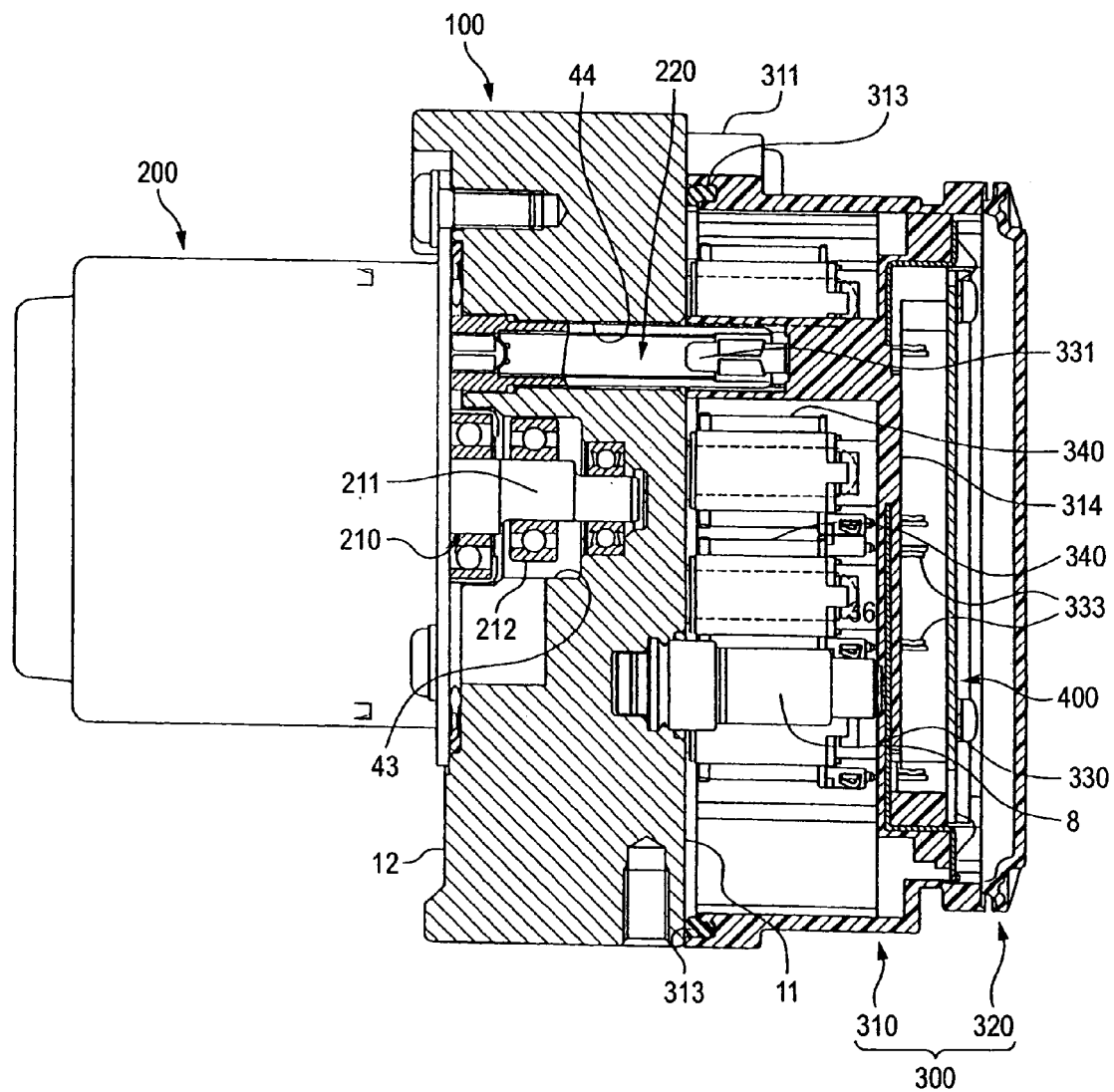
FIG. 4 is a sectional view of the base body of the vehicle brake control unit of the embodiment of the invention.

In addition, as shown in FIG. 4, the bearing hole 43 into which the output shaft 210 of the motor 200 is inserted and a terminal hole 44 into which a terminal rod 220 of the motor 200 is inserted are formed in the central portion (that is, the boundary portion between the flow path configuring portions 100A, 100B) of the base body 100. The bearing hole 43 is formed into a bottomed, stepped cylindrical shape and is made to open to the rear side 12 of the base body 100. In addition, the pump hole 38 (refer to FIGS. 5A, 5B) is made to open to a side wall of the bearing hole 43, and a ball bearing 212, which is fitted on an eccentric shaft portion 211 of the output shaft 210 so as to push on a plunger 162 of the pump 6, is accommodated in the vicinity of the opening in the pump hole 38. The terminal hole 44 is formed above the bearing hole 43 and passes through the base body 100 from the front to the rear thereof.

Next, configurations of the various valve components which are mounted in the respective holes will be described by reference to FIG. 8. Here, FIG. 8A is a perspective view showing the normally open type electromagnetic valve is, 2s, FIG. 8B is a sectional view showing a section of the normally open type electromagnetic valve 2s, FIG. 8C is a perspective view showing the normally closed type electromagnetic valve 3s, 4s and FIG. 4D is a sectional view showing a section of the normally closed type electromagnetic valve 3s.

Figure 8A:
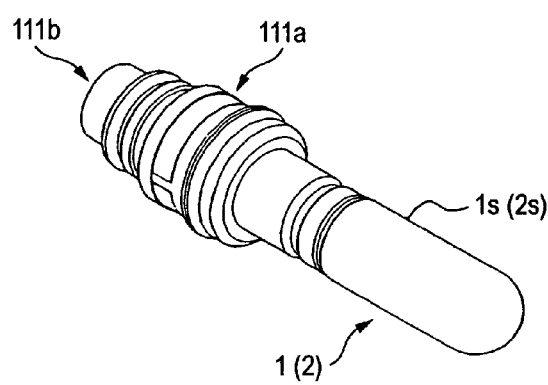
FIG. 8A is a perspective view of a normally open type electromagnetic valve.
Figure 8C:
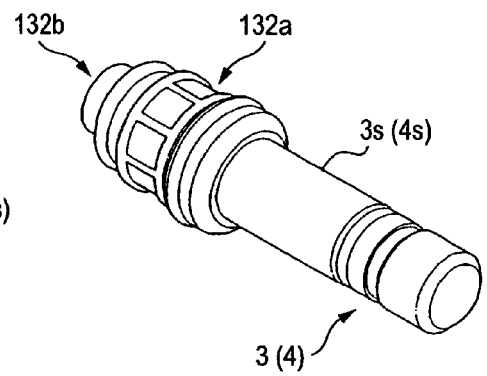
FIG. 8C is a perspective view of a normally closed type electromagnetic valve.

As shown in FIG. 8A, the normally open type electromagnetic valve is which constitutes the cut-off valve 1 and the normally open type electromagnetic valve 2s which constitutes the inlet valve 2 are put in such a state (an open state) that an opening 111a which is provided in a lateral side and an opening 11b which is provided in a bottom side thereof are made to communicate with each other when a magnet coil 340 (refer to FIG. 4) is deenergized by the control unit 400 (refer to FIG. 1), whereby a state results in which brake fluid can flow to pass through an interior of the electromagnetic valve concerned. When the solenoid coil 340 is energized by the control unit 400, a state results in which the communication between the opening 111a lying in the lateral side and the opening 111b lying in the bottom side thereof is interrupted (a closed state).

Note that since the normally open type electromagnetic valves 1s, 2s have the same configuration, hereinafter, a detailed description of the electromagnetic valve 2s will made.

Figure 8B:
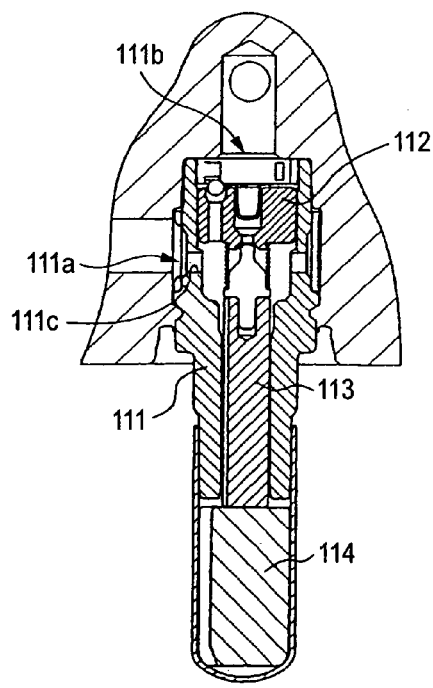
FIG. 8B is a sectional view of the normally open type electromagnetic valve.
Figure 8D:
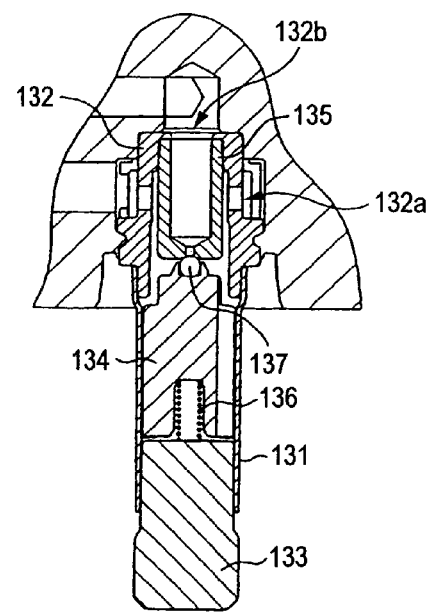
FIG. 8D is a sectional view of the normally closed type electromagnetic valve.

As shown in FIG. 8B, the normally open type electromagnetic valve 2s includes mainly:

a cylindrical stationary core 111;

a valve seat 112 which is mounted on a distal end side of the stationary core 111 in an interior thereof;

a valve body 113 which is similarly mounted in the interior of the stationary core 111 on a proximal end side thereof so as to slide therein; and a movable core 114 which pushes on the valve body 113.

In addition, a through hole 111c is formed in a lateral side of the stationary core 111, which constitutes an opening 111a through which brake fluid which flows into an interior of the electromagnetic valve 2s is made to flow out into the second flow path 52 or the fourth flow path 54. Then, when the solenoid coil 340 shown in FIG. 4 is energized, the valve body 113 moves towards the valve seat 112 so as to close an opening in the valve seat 112 in association with the movement of the movable core 114 which is attracted by the stationary core 111. As a result, a state results in which the opening 111a provided in the lateral side and the opening 111b provided in the bottom side of the stationary core 111 are cut off from each other. In addition, when the solenoid coil 340 is deenergized, in association with the separation of the movable core 114 from the stationary core 111, the valve body 113 moves towards the movable core 114 so as to open the opening in the valve seat 112. As a result, the opening 111a provided in the lateral side and the opening 111b provided in the bottom side of the stationary core 111 are made to communicate with each other.

As shown in FIG. 8C, when the solenoid coil 340 (refer to FIG. 4) is energized by the control unit 400, the normally closed type electromagnetic valve 3s which constitutes the outlet valve 3 and the normally closed type electromagnetic valve 4s which constitutes the suction valve 4 are put in a state (an open state) in which an opening 132a provided in a lateral side and an opening 132b provided in a bottom side thereof are made to communicate with each other, whereby brake fluid can flow through an interior of the electromagnetic valve concerned. Whereas when the solenoid coil is deenergized by the control unit 400, a state (a closed state) results in which the opening 132a provided in the lateral side and the opening 132b provided in the bottom side are cut off from each other.

Note that since the normally closed type electromagnetic valves 3s, 4s have the same configuration, the electromagnetic valve 3s will be described in detail Herebelow.

The normally closed type electromagnetic valve 3s includes mainly:

a cylindrical valve housing 131;

a cylindrical stationary member 132 which is mounted on a proximal end side in an interior of the valve housing 131;

a stationary core 133 which is secured to a distal end side of the valve housing 131 in the interior thereof;

a movable core 134 which is mounted slidably between the stationary member 132 and the stationary core 133 in the interior of the valve housing 131; and a bottomed cylindrical valve seat 135 which is secured in an interior of the stationary member 132.

An opening 132a is formed in a lateral side of the stationary member 132, through which braked fluid which is supplied thereto via the second flow path 52 or the fourth flow path 54 (refer to FIG. 5A) is allowed to flow thereinto. Furthermore, a biasing member 136 is provided between the stationary core 133 and the movable core 134 for biasing the movable core 134 towards the valve seat 135. Consequently, in such a state that the solenoid coil 340 (refer to FIG. 4) which is mounted in the control housing 300 is deenergized, a valve body 137 provided at a distal end of the movable core 134 is closely secured to the valve seat 135. As a result, the state results in which the opening 132a provided in the lateral side of the stationary member 132 and the opening 132b provided in the bottom side thereof are cut off from each other. Then, when the solenoid coil 340 (refer to FIG. 4) is energized, the movable core 134 is attracted by the stationary core 133 to move, and the movable core 134 moves towards the stationary core 133, whereby the valve seat 135 moves apart from the valve body 137. As a result, the state results in which the opening 132a provided in the lateral side and the opening 132b provided in the bottom side of the stationary member 132 are allowed to communicate with each other.

As shown in FIG. 1, the reservoir 5 includes:

a substantially bottomed cylindrical reservoir piston 151 which is mounted in the reservoir hole 37;

a reservoir spring 152 for biasing the reservoir piston 151 towards the bottom side (the upper side) of the reservoir hole 37;

a substantially bottomed cylindrical spring receiving member 153 which closes an opening in the reservoir 37; and a lid member 154.

The reservoir piston 151 is made to freely slide along an inner circumferential surface of the reservoir hole 37 on an outer circumferential surface thereof, and when brake fluid flows thereinto via the fifth flow path 55 (refer to FIG. 5B), the reservoir piston 151 moves towards the spring receiving member 153, so as to store the brake fluid. In addition, the check valve 5a (refer to FIG. 10) is mounted on the ninth flow path 59 shown in FIG. 5B, which permits only a flow of brake fluid from the reservoir hole 37 side to the eight flow path 58 side thereof.

As shown in FIG. 9, the pump 6 includes a cylinder 161, a plunger 162, a return spring 163, a seal stopper 164, a suction valve unit 165, a cap 166, a discharge valve unit 167 and a discharge side filter 168.

The cylinder 161 is made up of a bottomed cylindrical metal member whose inner circumferential surface is formed into a cylindrical surface, so as to form a suction valve chamber S1 which accommodates the suction valve unit 165.

The cylinder 161 includes:

a small diameter portion 161a which faces the pump hole 38 with a gap provided therebetween;

a press-fit portion 161b which is press fitted (fitted) into the pump hole 38;

a locking portion 161c which is made larger in diameter than the press fit portion 161b and is adapted to be locked in a stepped portion of the pump hole 38; and a bottom portion 161d (hereinafter, referred to as a "cylinder bottom portion 161d") which is made smaller in diameter than the locking portion 161c and is adapted to be fitted in a large diameter recessed portion 166a in the cap 166.

In addition, a through hole is formed in a central portion of the cylinder bottom portion 161d, which constitutes a discharge path 161e through which brake fluid sucked into the suction valve chamber S1 is discharged towards the cap 166.

Furthermore, a locking recessed portion 161f is formed on an outer circumferential surface of a lower end portion (a distal end portion of the small diameter portion 161a) of the cylinder 161 for holding the seal stopper 164, which will be described later.

The plunger 162 makes a reciprocating motion in an interior hollow space of the cylinder 161 in association with a rotary motion of the eccentric shaft portion 211 (refer to FIG. 1) of the motor 200. The plunger 162 includes:

a contact portion 162a which is brought into abutment with the ball bearing 212 which is mounted on the eccentric shaft portion 211 (refer to FIG. 1);

a suction portion 162b which constitutes a suction port for brake fluid;

a sliding portion 162c which reciprocates in the interior hollow space in the cylinder 161 while sliding;

a valve seat portion 162d which constitutes a valve seat of the suction valve unit 165, which will be described later; and a suction path 162h formed in an interior of the plunger 162.

The suction path 162h establishes a communication between an annular space S2 which is formed on the periphery of the suction portion 162b and the suction valve chamber S1 and is made to open to an outer circumferential surface of the suction portion 162b (an outer circumferential surface of the plunger 162) and an end face of the valve seat portion 162d (an upper end face of the plunger 162).

The contact portion 162a is loosely inserted in the pump hole 38 and protrudes into the bearing hole 43 for the motor 200 at a distal end portion thereof. In addition, an annular seal member 162e and a bush 162f, which are brought into abutment with the pump hole 38, are mounted slidably on the contact portion 162a. The suction portion 162b is formed between the contact portion 162a and the sliding portion 162c and at least part thereof project from an opening in the cylinder 161. The sliding portion 162c is a portion which slides in the inner hollow portion of the small diameter portion 161a of the cylinder 161, and an outside diameter of the sliding portion 162c is made larger than outside diameters of the suction portion 162b and the valve seat portion 162d which lie adjacent thereto and is made slightly smaller than an inside diameter of the small diameter portion 161a of the cylinder 161. The valve seat portion 162d is formed closer to the suction valve chamber S1 than the sliding portion 162c, and an annular seal ring 162g is annularly placed on the circumference of the valve seat portion 162d. The seal ring 162g seals the interior of the suction valve chamber S1 fluid tightly while sliding along an inner circumferential portion of the cylinder 161.

The return spring 163 is disposed in the suction valve chamber S1 in a compressed state and pushes the plunger 162 towards the bearing hole 43 by virtue of the restoring force thereof. The return spring 163 according to the embodiment is disposed between the cylinder bottom portion 161d of the cylinder 161 and the seal ring 162g annularly placed on the plunger 162, to thereby push on the plunger 162 via the seal ring 162g.

The seal stopper 164 is a frame-shaped member for preventing the dislocation of the seal member 162e and includes a frame body 164a which is disposed so as to surround the suction portion 162b of the plunger 162 and a locking piece 164b which extends outwards from the frame body 164a towards the cylinder 161, whereby the seal stopper 164 is held in the cylinder 161 by the locking piece 164b being locked in the locking recessed portion 161f of the cylinder 161.

The suction valve unit 165 opens and closes the suction path 162h and is accommodated in the suction valve chamber S1. More specifically, the suction valve unit 165 includes:

a spherical suction valve body 165a which is disposed so as to close an opening in the suction path 162h;

a retainer 165b which is disposed so as to cover the suction valve body 165a; and a suction valve spring 165c which is disposed in a compressed state between the suction valve body 165a and the retainer 165b. The suction valve body 165a is biased against the plunger 162 by virtue of the restoring force of the suction valve spring 165c. Note that the retainer 165b is fitted on the valve seat portion 162d of the plunger 162 at a lower end portion thereof and is held against the seal ring 162g by virtue of the restoring force of the return spring 163.

The cap 166 is provided to be placed on the cylinder bottom portion 161d of the cylinder 161 from the outside so as to cover it and is made up of a bottomed cylindrical metal member which is separate from the cylinder 161. Formed on an inside of the cap 166 are a lager diameter recessed portion into which the cylinder bottom portion 161d is press fitted and a small diameter recessed portion 166b which is made smaller in diameter than the Large diameter recessed portion 166a. The small diameter recessed portion 166b defines a discharge valve chamber S3 which accommodates therein the discharge valve unit 167 and the discharge side filter 168 together with the cylinder bottom portion 161d.

An outer circumferential surface of the cap 166 is recessed in a circumferential direction thereof so as to provide an annular locking groove 166c. A plastically deformed portion which is formed on a hole wall of the pump hole 38 fits in the locking groove 166c. In this embodiment, an outside diameter of an upper lid portion 166e which lies adjacent to the locking groove 166c in an upward direction is made smaller than an outside diameter of a lower lid portion 166d which lies adjacent to the locking groove 166c in a downward direction. The lower lid portion 166d is substantially the same as an inside diameter at portion lying further inwards than a stepped portion in an inlet portion of the pump hole 38 and is inserted in the portion concerned. The upper lid portion 166e projects from a bottom side of the stepped portion in the inlet portion of the pump hole 38 and a circumferential edge portion 166f of the projecting portion is chamfered.

An outside diameter of a flow path configuring portion 166g of the cap 166 which lies below the lower lid portion 166d is made smaller than the outside diameter of the lower lid portion 166d. An annular space S4 which communicates with the eighth flow path 58 is defined by an outer circumferential surface of the flow path configuring portion 166g and the pump hole 38. In addition, an outlet hole 166h is formed in the flow path configuring portion 166g, which establish a communication between the discharge valve chamber S3 and the annular space S4. The outlet hole 166h functions as an orifice which mitigates pulsation occurring in association with the reciprocation of the plunger 162.

The discharge valve unit 167 opens and closes the discharge path 161e formed in the cylinder bottom portion 161d of the cylinder 161 and is accommodated in the discharge valve chamber S3. More specifically, the discharge valve unit 167 is configured to include a spherical discharge valve body 167a which is disposed so as to close the discharge path 161e of the cylinder 161, and a discharge valve spring 167b which is disposed in a compressed state in the discharge valve chamber S3. The discharge valve body 167a is biased towards the discharge path 161e by virtue of the restoring force of the discharge valve spring 167b.

The discharge side filter 168 filtrating the brake fluid discharged from the discharge path 161e, is disposed so as to surround the discharge valve unit 167 within the discharge valve chamber S3, and is held by the cylinder 161 and the cap 166 therebetween so that at least portion thereof is compressed in an axial direction. More specifically, the discharge side filter 168 includes a filter main body 168B which allows brake fluid discharged from the discharge path 161e to pass therethrough to filtrate the brake fluid and a holding member 168A which holds the filter main body 168B.

Following this, the motor 200 and the control housing 300 which are assembled to the base body 100 will be described in detail.

The motor 200 shown in FIG. 1 constitutes a power supply for the pump 6 and is integrally secured to the rear side 12 (refer to FIG. 4) of the base body 100. As shown in FIG. 4, the eccentric shaft portion 211 is provided on the output shaft 210 of the motor 200. Further, as has been described above, the ball bearing 212 is fitted on the eccentric shaft portion 211. In addition, the terminal rod 220 for supplying current to a rotor is provided above the output shaft 210 so as to project. The terminal rod 220 is inserted into the terminal hole 44 formed in a central upper portion of the base body 100, and a distal end portion thereof is connected to a connecting terminal 331 of the control housing 300.

As shown in FIG. 1, the control housing 300 includes a control case 310 which is integrally secured to the front side 11 of the base body 100 so as to cover the electromagnetic valves 1s to 4s, the hydraulic pressure source side brake hydraulic pressure sensor 8 and the wheel side brake hydraulic pressure sensor 9 and a control cover 320 which closes tightly an opening in the control cover 310. In addition, the control case 310 includes a mounting portion 311 which covers the front side 11 of the base body 100 and a connector portion 312 in which connecting terminals to a battery and wheel speed sensors (not shown) are formed, and an endless seal member 313 (refer to FIG. 4) is mounted on the mounting portion 311. In addition, as shown in FIG. 4, a support plate portion 314 in which a bus bar 330 is embedded is formed integrally in an interior of the control case 310. In addition, the solenoid coils 340 for driving the electromagnetic valves 1s to 4s installed in the base body 1400 are mounted on the support plate 314. In addition to the connecting terminal 331 to the terminal rod 220 of the motor 200, a connecting terminal (not shown) to the control unit 400 and connecting terminals 333 to the solenoid coils are provided on the bus bar 330 so as to project therefrom.

In addition, since the interior of the control housing is made to communicate with the outside via a recessed portion 41 and a vent hole 42 shown in FIGS. 6A, 6B, an interior pressure of the control housing 300 is held at a similar level to the atmospheric pressure. Namely, the occurrence of intrusion of water and the like from the outside can be prevented by changing interior pressure of the control housing 300. Here, as shown in FIG. 6, since a water vapor permeation preventive material, not shown, is applied to the recessed portion 41 of the base body 100, there emerges no situation in which water or the like intrudes into the control housing 300.

The control unit 400 shown in FIG. 1 is such that a semiconductor chip is installed on a substrate on which an electronic circuit is printed. Also, the control unit 400 controls the opening and closing of the electromagnetic valves 1s to 4s and the operation of the motor 200 based on information obtained from the various sensors such as the hydraulic pressure source side brake fluid sensor 8, the wheel side brake hydraulic pressure sensor 9, the wheel speed sensors 401, 402, 403, 404 (refer to FIG. 10) and programs which are stored therein in advance.

Following this, actual flows of brake fluid will be described in detail which result when performing the normal brake control, the anti-lock brake control and the behavior stabilizing control.

(Normal Brake Control)

In the normal brake control, as has been described above, the normally closed type electromagnetic valve 4s (refer to FIG. 1) which constitutes the suction valve 4 is in the closed state and the normally open type electromagnetic valve is (refer to FIG. 1) which constitutes the cut-off valve 1 is in the open state. Thus, brake fluid which has flowed in from the inlet port 21 flows, as shown in FIG. 5A, into the third mounting hole 36 via the first flow path 51 and the seventh flow path 57 and the flows into the eighth flow path 58 (refer to FIG. 5B) through the interior of the electromagnetic valve 1s (refer to FIG. 1) which is being in the open state. As shown in FIG. 5B, the brake fluid that has flowed into the eighth flow path 58 flows upwards through the annular space S4 and thereafter flows into the bottom portion of the first inner mounting hole 32 and the bottom portion of the first outer mounting hole 33 through the third flow path 53. Then, as shown in FIG. 6A, the brake fluid that has flowed into the bottom portion of the first inner mounting hole 32 flows into the second flow path 52 through the interior of the electromagnetic valve 2s (refer to FIG. 1) which is being in the open state to thereby reach the wheel brake FR through the outlet port 22L. Similarly, the brake fluid that has flowed into the bottom portion of the first outer mounting hole 33 flows into the fourth flow path 54 through the interior of the electromagnetic valve 2s (refer to FIG. 1) which is being in the open state to thereby reach the wheel brake RL through the outlet port 22R.

Here, the brake fluid which has flowed into the second flow path 52 which reaches the right front wheel brake FR flows into the wheel side sensor mounting hole 46. Then, the brake hydraulic pressure within the wheel hydraulic pressure line B is measured by the wheel side brake hydraulic pressure sensor 9, and the measured value is then captured into the control unit 400.

(Anti-Lock Brake Control)

In the anti-lock brake control, for example, when the brake hydraulic pressure which is applied to the wheel brake FR is reduced, as has been described above, the control unit 400 (refer to FIG. 10) puts the inlet valve 2 associated with the wheel brake FR in the closed state and the outlet valve 3 in the open state. Then, the brake fluid which is applied to the wheel brake FR flows, as shown in FIG. 5A, into the side portion of the second inner mounting hole 34 through the outlet port 22L and the second flow path 52 and furthermore flows, as shown in FIG. 5B, into the fifth flow path 55 through the interior of the electromagnetic valve 3s (refer to FIG. 1) which is being in the open state to thereby flow into the reservoir hole 37. In addition, since the electromagnetic valve 2s is being in the closed state, the brake fluid that has flowed into the first inner mounting hole 32 does not flow into the third flow path 53 but passes through a space between the side wall of the first inner mounting hole 32 and the outer circumferential surface of the electromagnetic valve 2s (refer to FIG. 1) to flow out towards the second inner mounting hole 34. In addition, when executing an anti-lock brake control, the motor 200 is driven by the control unit 400 so as to actuate the pump 6. As a result, brake fluid stored in the reservoir hole 37 is sucked into the pump hole 38 by way of the ninth flow path 59 and is then discharged to the eighth flow path 58. When reducing the brake hydraulic pressure applied to the wheel brake RL (refer to FIG. 10), as shown in FIG. 5A, the brake fluid passes through the outlet port 22R and the fourth flow path 54 to flow into the side portion of the second outer mounting hole 35. Furthermore, as shown in FIG. 5B, the brake fluid passes through the interior of the electromagnetic valve (refer to FIG. 1) which is being in the open state and flows into the sixth flow path 56, then, passing through the fifth flow path 55 to flow into the reservoir hole 37.

When holding constant the brake hydraulic pressure applied to the wheel brake FR in the anti-lock brake control, as has been described above, since the inlet port 2 and the outlet port 3 are put in the closed state by the control unit 400 (refer to FIG. 10), there occurs neither the flow of brake fluid into the second flow path 52 nor the flow of brake fluid out of the second flow path 52.

In addition, when increasing the brake hydraulic pressure applied to the wheel brake FR in the anti-lock brake control, as has been described above, since the inlet valve 2 is put in the open state and the outlet port 3 is put in the closed state by the control unit 400, the flow of brake fluid becomes identical to that occurring in the normal brake control.

In this embodiment, the wheel side brake hydraulic pressure sensor 9 is mounted in the wheel side sensor mounting hole 46 which communicates with the right front wheel brake FR via the outlet port 22L and the second flow path 52. Thus, when executing the anti-lock brake control that has been described above, the brake hydraulic pressure within the wheel hydraulic pressure line B which links to the wheel brake FR can be actually measured. Therefore, in the control unit 400, a delicate hydraulic pressure control can be implemented according to the brake hydraulic pressure so measured, and a brake hydraulic pressure which is best suitable for the wheel brake FR can be held in an ensured manner and with ease.

In particular, in this embodiment, by measuring the brake hydraulic pressures applied to the wheel brakes FR, FL of the front wheels to which more brake load is applied, a brake hydraulic pressure control is implemented in which emphasis is placed on braking force control. Furthermore, since the front wheels constitute the drive wheels, a brake hydraulic pressure control is also implemented in which emphasis is placed on traction control.

(Behavior Stabilizing Control)

In the behavior stabilizing control, for example, when actuating the wheel brake FR, as has been described above, after the control unit 400 puts the cut-off valve 1 in the closed state and the suction valve 4 in the open state, the motor 200 is actuated to drive the pump 6 (refer to FIG. 9). When the pump 6 is driven, brake fluid remaining in the inside of the pump hole 38 is discharged to the eighth flow path 58, as shown in FIG. 7. The brake fluid discharged into the eighth flow path 58 flows into the first inner mounting hole 32 through the third flow path 53 and flows further to the second flow path 52 through the interior of the electromagnetic valve 2s (refer to FIG. 1) which is being in the open state, then reaching the wheel brake FR through the outlet port 22L. In addition, when the pump 6 is actuated, since the electromagnetic valve 4s (refer to FIG. 1) is in the open state, brake fluid remaining on the first flow path 51 side (including the brake fluid remaining in the master cylinder M) flows into the pump hole 38 through the interior of the electromagnetic valve 4s.

Also when executing the behavior stabilizing control that has been described above, the brake hydraulic pressure within the wheel hydraulic pressure line B which links with the right front wheel brake FR can actually be measured by the wheel side brake hydraulic pressure sensor 9. Thus, in the control unit 400, a delicate hydraulic pressure control can be implemented so that the brake hydraulic pressure in the wheel hydraulic pressure line B becomes a desired value, thereby making it possible to implement a highly accurate brake control.

According to the base body 100 of the brake control unit U which has the specific positional relationship that has been described heretofore, the miniaturization of the unit can be realized while keeping the twelve electromagnetic valves is, 2s, 3s, 4s and the plurality of (three) hydraulic pressure sensors 8, 9, 9 on the one side (the front side 11) of the base body 100. Furthermore, in the brake control unit U to which the base body 100 so configured is applied, it becomes possible to implement the multiple complex and highly accurate safety functions which involve the control of the vehicle brakes.

In addition, the wheel side brake hydraulic pressure sensors 9, 9 are mounted in the wheel side sensor mounting holes 46 which communicate, respectively, with the outlet ports 22L, 22R which link, respectively, with the wheel brakes FR, FL of the front wheels, so that magnitudes of brake hydraulic pressures which are applied to the wheel brakes FR, FL of the front wheels can be measured. Consequently, since the wheel side brake hydraulic pressure sensor 9 can be used to detect the brake hydraulic pressure of the front wheel to which more brake load is applied, the accuracy of the brake hydraulic pressure control can be enhanced further. In addition, since a brake hydraulic pressure sensor for detecting the brake hydraulic pressure of the rear wheel does not have to be provided, the miniaturization of the brake control unit U is attained, and the reduction in weight of the brake control unit u can also be attained.

Note that while in the embodiment, the first inner mounting hole 32 and the second inner mounting hole 33 are disposed in the same height positions, the mounting holes may be disposed offset vertically. Similarly, the second inner mounting hole 34 and the second outer mounting hole 35 may also be disposed offset vertically.

In addition, while in the embodiment, the first inner mounting hole 32 and the second inner mounting hole 34 are disposed in such a manner that a line which connects centers of the respective mounting holes becomes parallel to the first flow path 51, the invention is not limited thereto and hence, they may be disposed offset horizontally.

Additionally, while in the embodiment, the first outer mounting hole 33, the second outer mounting hole 35 and the third mounting hole 36 are disposed on the straight line so as to be aligned with one another, the invention is not limited thereto, and hence, they may be disposed offset horizontally.

Note that the arrangement of the electromagnetic valves and the hydraulic pressure sensors which are mounted in the mounting holes 31 to 36 may be changed. For example, in the brake control unit, after the configurations of the flow paths residing in the interiors of the flow path configuring portions 100A, 100B, the normally closed type electromagnetic valves which constitute the output valves 3 may be mounted in the first inner mounting hole 32 and the first outer mounting hole 33, and the normally open type electromagnetic valves which constitute the inlet valves 2 may be mounted in the second inner mounting hole 34 and the second outer mounting hole 35.

Furthermore, while in the embodiment, the brake hydraulic pressures applied to the wheel brakes FR, FL of the front wheels are made to be measured by the wheel side brake hydraulic pressure sensors 9, 9, it is possible to increase the accuracy of brake hydraulic pressure control even though a configuration may be adopted, in which the brake hydraulic pressures applied to the wheel brakes RR, RL of the rear wheels are measured irrespective of whether the drive wheels are constituted by the front wheels or the rear wheels.

In addition, while in the embodiment, the description has been made as the invention being applied to the front-wheel-drive vehicle, needless to say, the invention can, of course, be applied to a rear-wheel-drive vehicle and a four-wheel-drive vehicle. In the case of the rear-wheel-drive vehicle, in the event that the brake hydraulic pressures applied to the wheel brakes RR, RL of the rear wheels which are drive wheels by the wheel side brake hydraulic pressure sensors 9, 9, a brake hydraulic pressure control can be implemented in which emphasis is placed on traction control, while the brake hydraulic pressures applied to the wheel brakes FR, FL of the front wheels are measured by the wheel side brake hydraulic pressure sensors 9, 9, a brake hydraulic pressure control can be implemented in which emphasis is placed on braking force control. In addition, in the case of the four-wheel-drive vehicle, in the event that the brake hydraulic pressures applied to the wheel brakes FR, FL of the front wheels, a brake hydraulic pressure control can be implemented in which emphasis is placed on both traction control and braking force control.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle brake control unit base body for a vehicle brake control unit which comprises:
   a first brake output circuit for actuating at least one of wheel brakes; and
   a second brake output circuit for actuating the remaining wheel brakes,
   the vehicle brake control unit base body comprising:
   first and second flow path configuring portions which correspond to the respective first and second brake output circuits and are formed on left and right hand parts of the base body across a center line thereof, respectively,
   wherein each of the first and second flow path configuring portions comprises:
   an inlet port to which a piping from a hydraulic pressure source is connected;
   at least one outlet port to which at least one of the wheel brakes are connected;
   a central mounting hole;
   a central flow path which originates from the inlet port and passes through the central mounting hole;
   a first inner mounting hole and a first outer mounting hole which are provided at upstream side of the central mounting hole so as to oppose to each other via the central flow path;
   a second inner mounting hole and a second outer mounting hole which are provided at downstream side of the central mounting hole so as to oppose to each other via the central flow path;
   a third mounting hole which is disposed so that the first outer mounting hole, the second outer mounting hole and the third mounting hole are arranged in this order in a vertical direction;
   a wheel side sensor mounting hole which is disposed on an extension of the outlet ports and also between the first inner mounting hole and the second inner mounting hole, and mounts a wheel side brake hydraulic pressure sensor measuring brake hydraulic pressure outputted to one of the wheel brakes;and
   a hydraulic pressure source side sensor mounting hole which is disposed on the center line of the base body so as to straddle the center line to extend to the respective flow path configuring portions and mounts a hydraulic pressure source side brake hydraulic pressure sensor for measuring brake hydraulic pressure outputted from the hydraulic pressure source,
   wherein the respective central mounting hole, the first inner and outer mounting holes, the second inner and outer mounting holes and the third mounting hole mounts an electromagnetic valve.

2. A vehicle brake control unit comprising:
   a brake output circuit for actuating at least one of wheel brakes;
   a brake output circuit for actuating the remaining wheel brakes;
   the base body as set forth in claim 1;
   normally open electromagnetic valves which constitute inlet valves mounted in the first inner mounting holes and the first outer mounting holes, respectively;
   normally closed electromagnetic valves which constitute suction valves mounted in the central mounting holes;
   normally closed electromagnetic valves which constitute outlet valves mounted in the second inner mounting holes and the second outer mounting holes, respectively;
   normally open electromagnetic valves which constitute cut-off valves mounted in the third mounding holes;
   a hydraulic pressure source side brake hydraulic pressure sensor mounted in the hydraulic pressure source side sensor mounting hole and measuring magnitude of brake hydraulic pressure in the hydraulic pressure source;

wheel side brake hydraulic pressure sensors mounted in the wheel side sensor mounting holes and measuring magnitude of brake hydraulic pressure applied to the wheel brake;

a motor which is assembled on a rear side of the base body and drives a pump;

a control housing assembled on a front side of the base body so as to cover the respective electromagnetic valves; and a control unit which is accommodated in the control housing and controls operations of the motor and the respective electromagnetic valves.

3. The vehicle brake control unit as set forth in claim 2, wherein the first brake output circuit is connected to the wheel brakes of a front wheel and a rear wheel, the second brake output circuit is connected to the wheel brakes of the other front wheel and the other rear wheel and each of the wheel side brake hydraulic pressure sensors measures magnitude of the brake hydraulic pressure applied to the front wheel.

4. The vehicle brake control unit as set forth in claim 2, wherein the first brake output circuit is connected to the wheel brakes of a front wheel and a rear wheel, the second brake output circuit is connected to the wheel brakes of the other front wheel and the other rear wheel and each of the wheel side brake hydraulic pressure sensors measures magnitude of brake hydraulic pressure applied to the wheel brake of the front wheel or the rear wheel which constitutes a drive wheel.

* * * * *